US011779898B2

(12) United States Patent
Khatiwada et al.

(10) Patent No.: US 11,779,898 B2
(45) Date of Patent: Oct. 10, 2023

(54) PHOTOCATALYTIC REACTOR SYSTEM

(71) Applicant: Syzygy Plasmonics Inc., Houston, TX (US)

(72) Inventors: Suman Khatiwada, Houston, TX (US); Shreya Shah, Houston, TX (US); John Welch, Houston, TX (US); Trevor William Best, Houston, TX (US); Braden Paul Adams, Houston, TX (US)

(73) Assignee: Syzygy Plasmonics Inc., Houston, TX (US)

( * ) Notice: Subject to any disclaimer, the term of this patent is extended or adjusted under 35 U.S.C. 154(b) by 0 days.

(21) Appl. No.: 17/372,445

(22) Filed: Jul. 10, 2021

(65) Prior Publication Data

US 2021/0339220 A1  Nov. 4, 2021

Related U.S. Application Data

(63) Continuation of application No. PCT/US2020/013206, filed on Jan. 10, 2020, and a
(Continued)

(51) Int. Cl.
*B01J 19/12* (2006.01)
*B01J 19/00* (2006.01)
(Continued)

(52) U.S. Cl.
CPC ......... *B01J 19/122* (2013.01); *B01J 19/0013* (2013.01); *B01D 53/885* (2013.01);
(Continued)

(58) Field of Classification Search
CPC ...... B01J 19/122; B01J 19/123; B01J 19/127; B01J 19/0013; B01J 2219/1218;
(Continued)

(56) References Cited

U.S. PATENT DOCUMENTS 3,554,887 A  1/1971  Feehs
4,517,063 A  5/1985  Cirjak
(Continued)

FOREIGN PATENT DOCUMENTS

AU  2018286458 B2  7/2020
BR  PI0701773 A2  12/2008
(Continued)

OTHER PUBLICATIONS

Li et al. Hydrogen Evolution by Photocatalytic Steam Reforming of Methane over PT/TiO2. Acta Phys.—Chim. Sin., 2012, 28 (2) 450-456. (English Abstract).
(Continued)

*Primary Examiner* — Lessanework Seifu
(74) *Attorney, Agent, or Firm* — GrowIP Law Group LLC

(57) ABSTRACT

The present disclosure relates generally to reactor systems that include (a) a housing having an interior surface that may be at least partially reflective, (b) at least one reactor cell disposed within an interior of the housing, the at least one reactor cell including an enclosure and a plasmonic photocatalyst on a catalyst support disposed within the at least one enclosure, where the enclosure is optically transparent and includes at least one inlet for a reactant to enter the at least one cell and at least one outlet for a reformate to exit the at least one cell and (c) at least one light source disposed within the interior of the housing and/or external to the housing. At least one light-management feature and/or at least one thermal-management feature is applied to the reactor cell, reactor system, or a reformer system comprising many reactor systems, in order to improve efficiency.

20 Claims, 19 Drawing Sheets

Related U.S. Application Data continuation-in-part of application No. PCT/US2020/013190, filed on Jan. 10, 2020, and a continuation-in-part of application No. 16/625,495, filed as application No. PCT/US2018/039470 on Jun. 26, 2018, application No. 17/372,445 is a continuation-in-part of application No. 16/625,527, filed as application No. PCT/US2018/039476 on Jun. 26, 2018.

(60) Provisional application No. 63/202,099, filed on May 27, 2021, provisional application No. 62/798,110, filed on Jan. 29, 2019, provisional application No. 62/790,855, filed on Jan. 10, 2019, provisional application No. 62/525,301, filed on Jun. 27, 2017, provisional application No. 62/525,305, filed on Jun. 27, 2017, provisional application No. 62/525,380, filed on Jun. 27, 2017, provisional application No. 62/586,675, filed on Nov. 15, 2017.

(51) Int. Cl.
  *B01D 53/88* (2006.01)
  *C02F 1/32* (2023.01)
  *C02F 1/72* (2023.01)

(52) U.S. Cl.
  CPC . *B01D 2255/802* (2013.01); *B01J 2219/0871* (2013.01); *B01J 2219/0892* (2013.01); *B01J 2219/12* (2013.01); *B01J 2219/1928* (2013.01); *C02F 1/32* (2013.01); *C02F 1/725* (2013.01); *C02F 2305/10* (2013.01)

(58) Field of Classification Search
  CPC ........ B01J 2219/1928; B01J 2219/0871; B01J 2219/0892; B01J 2219/0875; B01J 2219/0877; C02F 1/32; C02F 1/725; C02F 2201/3222; C02F 2201/3227; C02F 2201/3228; C02F 2305/10
  See application file for complete search history.

(56) References Cited

U.S. PATENT DOCUMENTS

| | | | |
|---|---|---|---|
| 4,788,040 | A | 11/1988 | Campagnolo et al. |
| 5,030,607 | A | 7/1991 | Colmenares |
| 5,298,226 | A | 3/1994 | Nowobilski |
| 5,501,801 | A | 3/1996 | Zhang et al. |
| 5,505,912 | A | 4/1996 | Hallett |
| 5,538,931 | A | 7/1996 | Heinrichs et al. |
| 6,217,834 | B1 | 4/2001 | Hosein et al. |
| 6,248,217 | B1 | 6/2001 | Biswas et al. |
| 6,979,362 | B2 | 12/2005 | Jackson |
| 8,506,886 | B2 | 8/2013 | Owen et al. |
| 8,753,579 | B2 | 6/2014 | Sattler et al. |
| 8,999,283 | B1 | 4/2015 | Kuhn et al. |
| 9,404,797 | B2 | 8/2016 | Walters |
| 10,766,024 | B2 | 9/2020 | Halas et al. |
| 2005/0231711 | A1 | 10/2005 | Benoit et al. |
| 2008/0299017 | A1 | 12/2008 | Sattler et al. |
| 2009/0321244 | A1 | 12/2009 | Smith et al. |
| 2009/0321365 | A1 | 12/2009 | Eriksson et al. |
| 2010/0137131 | A1 | 6/2010 | Awazu et al. |
| 2010/0221166 | A1 | 9/2010 | Muggli |
| 2012/0168300 | A1 | 7/2012 | Kolios et al. |
| 2012/0228236 | A1 | 9/2012 | Hawkins et al. |
| 2012/0279872 | A1 | 11/2012 | Chen et al. |
| 2013/0008857 | A1 | 1/2013 | Foster |
| 2013/0026027 | A1 | 1/2013 | Bae et al. |
| 2013/0121889 | A1 | 5/2013 | Usami |
| 2014/0272623 | A1 | 9/2014 | Jennings |
| 2016/0193595 | A1 | 7/2016 | Nagpal et al. |
| 2016/0340593 | A1 | 11/2016 | Macdonnell et al. |
| 2016/0367968 | A1 | 12/2016 | Guerrero et al. |
| 2017/0173350 | A1 | 6/2017 | Bourke, Jr. et al. |
| 2018/0147313 | A1 | 5/2018 | Cheng et al. |
| 2018/0333712 | A1 | 11/2018 | Halas et al. |
| 2021/0023255 | A1 | 1/2021 | Keith |
| 2021/0178377 | A1 | 6/2021 | Khatiwada et al. |
| 2021/0178378 | A1 | 6/2021 | Khatiwada et al. |

FOREIGN PATENT DOCUMENTS

| | | | |
|---|---|---|---|
| CN | 1941485 | A | 4/2007 |
| CN | 1962036 | A | 5/2007 |
| CN | 103861542 | A | 6/2014 |
| CN | 104056546 | A | 9/2014 |
| CN | 104069722 | A | 10/2014 |
| CN | 105289685 | A | 2/2016 |
| ES | 2577904 | A2 | 7/2016 |
| GB | 2552171 | A | 1/2018 |
| JP | 2002166176 | A | 6/2002 |
| JP | 2002210333 | A | 7/2002 |
| JP | 2003340241 | A | 12/2003 |
| JP | 2005169298 | A | 6/2005 |
| JP | 2006107956 | A | 4/2006 |
| JP | 2006256901 | A | 9/2006 |
| JP | 2007061730 | A | 3/2007 |
| JP | 2007308318 | A | 11/2007 |
| JP | 2008264611 | A | 11/2008 |
| JP | 4589943 | B2 | 12/2010 |
| JP | 2011110492 | A | 6/2011 |
| JP | 2016530069 | A | 9/2016 |
| KR | 101712373 | B1 | 3/2017 |
| KR | 101725059 | B1 | 4/2017 |
| MX | 2011000963 | A | 5/2011 |
| RU | 2386474 | C1 | 4/2010 |
| RU | 2437715 | C1 | 12/2011 |
| WO | 2012017637 | A1 | 2/2012 |
| WO | 2012031357 | A1 | 3/2012 |
| WO | 2015002944 | A2 | 1/2015 |
| WO | 2015109217 | A1 | 7/2015 |
| WO | 2016030753 | A1 | 3/2016 |
| WO | 2016052987 | A1 | 4/2016 |
| WO | 2018011550 | A1 | 1/2018 |
| WO | 2018153630 | A1 | 8/2018 |
| WO | 2018231398 | A9 | 1/2019 |
| WO | 2019005777 | A1 | 1/2019 |
| WO | 2019005779 | A1 | 1/2019 |
| WO | 2020146799 | A1 | 7/2020 |
| WO | 2020146813 | A1 | 7/2020 |

OTHER PUBLICATIONS

Alfano O.M. et al., "Photocatalysis in Water Environments Using Artificial and Solar Light," Catalysis Today, 2000; 58:199-230.

De Lasa H. et al., "Photocatalytic Reaction Engineering," Springer, Boston, MA, 2005.

Kachaev A.A. et al. "Optically Transparent Ceramic (Review)". Glass Ceram 73, 117-123 (2016).

Mozia S., "Photocatalytic Membrane Reactors (PMRs) in Water and Wastewater Treatment: A Review," Sep. Purif. Technol., 2010, 73 (2), 71-91.

Nair V. et al., "Thermo-Photocatalysis: Environmental and Energy Applications," ChemSusChem, 2019, 12 (10), 2098-2116.

Pasquali M. et al., "Radiative Transfer in Photocatalytic Systems," AIChE J., 1996, 42 (2), 532-537.

Robatjazi H. et al. "Plasmon-Driven Carbon-Fluorine (C(Sp 3)-F) Bond Activation with Mechanistic Insights into Hot-Carrier-Mediated Pathways " Nat. Catal. 2020, 3 (7), 563-73.

Shou et al. "Synthesis and characterization of a nanocomposite of goethite nanorods and reduced graphene oxide for electrochemical capacitors" J. Solid State Chemistry, 2012, vol. 185, 191-197.

Stankiewicz A. "Energy Matters: Alternative Sources and Forms of Energy for Intensification of Chemical and Biochemical Processes" Chem. Eng. Res. Des., 84 (7A), 511-521 (2006).

Su Y. et al., "Photochemical Transformations Accelerated in Continuous-Flow Reactors: Basic Concepts and Applications," Chem.—A Eur. J., 2014, 20 (34), 10562-10589.

(56) References Cited

OTHER PUBLICATIONS

Swearer, Dayne F., et al., "Heterometallic antenna-reactor complexes for photocatalysis" PNAS, vol. 113, No. 32, Aug. 9, 2016.
Van Gerven T. et al., "A Review of Intensification of Photocatalytic Processes," Chem. Eng. Process. Process Intensif., 2007, 46 (9 Spec. Iss.), 781-789.
Van Gerven T. et al., "Structure, Energy, Synergy, Time." Ind. Eng. Chem. Res., 2009, 2465-2474.
Xiao, et al. "Visible light-driven cross-coupling reactions at lower temperatures using a photocatalyst of palladium and gold alloy nanoparticles" ACS Catal., 2014, vol. 4, 1725-1734.
Zhou L. et al., "Light-Driven Methane Dry Reforming with Single Atomic Site Antenna-Reactor Plasmonic Photocatalysts," Nat. Energy, 2020, 5 (1), 61-70.
Zhou L. et al., "Quantifying Hot Carrier and Thermal Contributions in Plasmonic Photocatalysis," Science, Oct. 5, 2018, 69-72.
International Preliminary Report on Patentability for Int. App. No. PCT/US2018/032375, dated Nov. 12, 2019.
International Search Report and Written Opinion for Int. App. No. PCT/US2018/032375, dated Apr. 11, 2019.
International Search Report and Written Opinion for Int. App. No. PCT/US2018/039470, dated Sep. 7, 2018.
Paolo Ciambelli et al, "Improved Performances of a Fluidized Bed Photoreactor by a Microscale Illumination System", International Journal of Photoenergy, vol. 2009, Jan. 1, 2009 (Jan. 1, 2009), pp. 1-7.
Zacarias Silvia Mercedes et al: "Design and performance evaluation of a photocatalytic reactor for indoor air disinfection", Environmental Science and Pollution Research, Springer Berlin Heidelberg, Berlin/Heidelberg, vol. 28, No. 19, Nov. 21, 2020, pp. 23859-23867.

PHOTOCATALYTIC REACTOR SYSTEM

BACKGROUND OF THE DISCLOSURE

1. Related Applications

The present application is a continuation of International Application No. PCT/US2020/013206, filed on Jan. 10, 2020, which claims priority to U.S. Provisional Patent Application Nos. 62/790,855, filed on Jan. 10, 2019, and 62/798,110, filed on Jan. 29, 2019. The present application is also a continuation-in-part of International Application No. PCT/US2020/013190, filed on Jan. 10, 2020, which claims priority to U.S. Provisional Patent Application Nos. 62/790,855, filed on Jan. 10, 2019, and 62/798,110, filed on Jan. 29, 2019. The present application additionally claims priority to U.S. Provisional Patent Application No. 63/202,099, filed on May 27, 2021. The present application is also a continuation-in-part of U.S. patent application Ser. No. 16/625,495, filed on Dec. 20, 2019, which is a U.S. National Stage Filing of International Application No. PCT/US2018/039470, filed on Jun. 26, 2018, which claims priority to U.S. Provisional Patent Application Nos. 62/525,301, filed on Jun. 27, 2017, 62/525,305, filed on Jun. 27, 2017, 62/525,380, filed on Jun. 27, 2017, and 62/586,675, filed on Nov. 15, 2017. The present application is also a continuation-in-part of U.S. patent application Ser. No. 16/625,527, filed on Dec. 20, 2019, which is a U.S. National Stage Filing of International Application No. PCT/US2018/039476, filed on Jun. 26, 2018, which claims priority to U.S. Provisional Patent Application Nos. 62/525,301, filed on Jun. 27, 2017, 62/525,305, filed on Jun. 27, 2017, 62/525,380, filed on Jun. 27, 2017, and 62/586,675, filed on Nov. 15, 2017. The disclosures of each of the above-listed applications are hereby incorporated by reference herein for all purposes. The present application additionally hereby incorporates by reference the entireties of International Patent Application No. PCT/US18/32375, filed on May 11, 2018, and U.S. patent application Ser. No. 15/977,843, filed on May 11, 2018.

2. Field of the Disclosure

The present disclosure relates generally to reactor systems for plasmonic photocatalytic chemical reactions.

3. Technical Background

Industrial processes depend extensively on heterogeneous catalysts for chemical production and mitigation of environmental pollutants. These processes often rely on metal nanoparticles (e.g., palladium, platinum, ruthenium, or rhodium) dispersed into high surface area support materials to both maximize catalytically active surface area and for the most cost-effective use of the catalysts. The catalytic processes utilizing transition metal nanoparticles are often energy intensive, relying on high temperatures and pressures to maximize catalytic activity.

The reactor systems described in International Patent Application No. PCT/US2018/039476 utilize transparent reactor cells with an artificial or natural light source and can be designed to maximize absorption of one or more target wavelengths and/or to catalyze a desired chemical reaction. This, in turn, can provide cost and/or energy-efficiency benefits over conventional catalytic processes utilizing transition metal nanoparticles. However, there remains a need for improved plasmonic photocatalytic reactor systems, to provide further energy efficiencies and/or provide other benefits.

SUMMARY OF THE DISCLOSURE

The inventors have developed efficient reactor systems for plasmonic photocatalytic chemical reactions. The reactor systems of the disclosure include innovative light and/or thermal management features to improve energy efficiency for plasmonic photocatalysis.

Thus, in one aspect, the present disclosure provides a reactor system that includes a housing and at least one reactor cell disposed within an interior of the housing. The at least one reactor cell comprising an enclosure and a plasmonic photocatalyst on a catalyst support disposed within the at least one enclosure, wherein the enclosure is optically transparent and comprises at least one inlet for a reactant to enter the at least one cell and at least one outlet for a reformate to exit the at least one cell. When at least one light source is applied, the reactor cell is configured to transform the reactant into the reformate. At least one light-management feature and/or at least one thermal-management feature is applied to the reactor cell, reactor system, or a reformer system comprising many reactor systems, in order to improve efficiency.

BRIEF DESCRIPTION OF THE DRAWINGS

The accompanying drawings are included to provide a further understanding of the systems, methods, and devices of the disclosure, and are incorporated in and constitute a part of this specification. The drawings are not necessarily to scale, and sizes of various elements may be distorted for clarity and/or illustrated as simplistic representations in order to promote comprehension. The drawings illustrate one or more embodiment(s) of the disclosure, and together with the description, serve to explain the principles and operation of the disclosure.

DETAILED DESCRIPTION

Before the disclosed systems and methods are described, it is to be understood that the aspects described herein are not limited to specific embodiments, apparatus, or configurations, and as such can vary. It is also to be understood that the terminology used herein is for the purpose of describing particular aspects only and, unless specifically defined herein, is not intended to be limiting.

Throughout this specification, unless the context requires otherwise, the words "comprise" and "include" and variations (e.g., "comprises," "comprising," "includes," and "including") will be understood to imply the inclusion of a stated component, feature, element, or step or group of components, features, elements or steps but not the exclusion of any other component, feature, element, or step or group of components, features, elements or steps.

As used in the specification and the appended claims, the singular forms "a," "an," and "the" include plural referents unless the context clearly dictates otherwise.

As used herein, the term "coupling" includes physical, electronic, thermal, or optical coupling of one element to another element.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All percentages, ratios and proportions herein are by weight, unless otherwise specified. A weight percent (weight %, also as wt %) of a component, unless specifically stated to the contrary, is based on the total weight of the composition in which the component is included (e.g., on the total amount of the catalyst material).

Figure 2A:
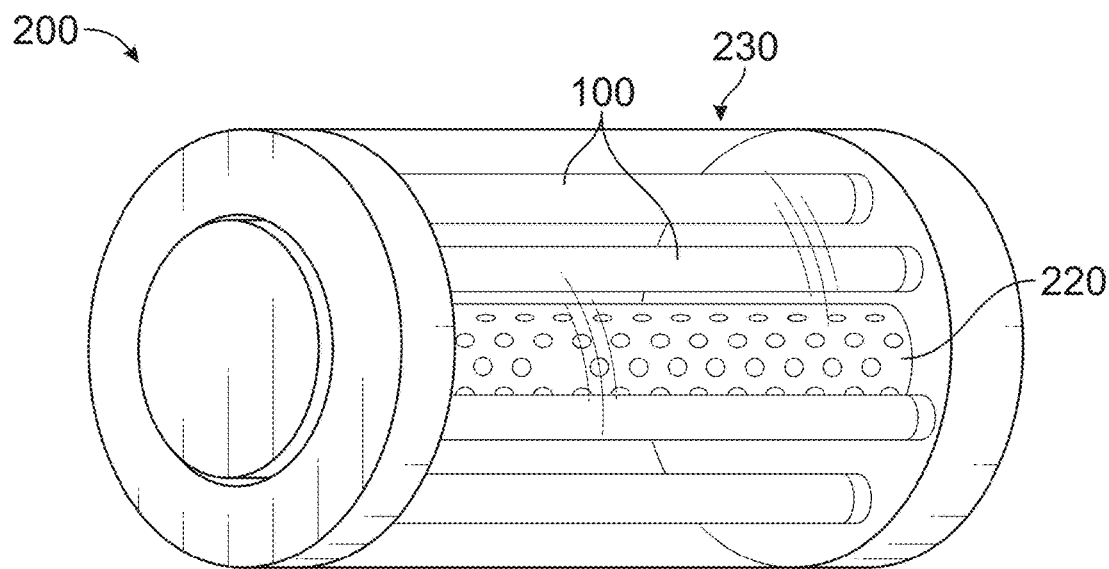
FIG. 2A is a simplified perspective side view of a configuration of a reactor system according to one embodiment of the disclosure.
Figure 2B:
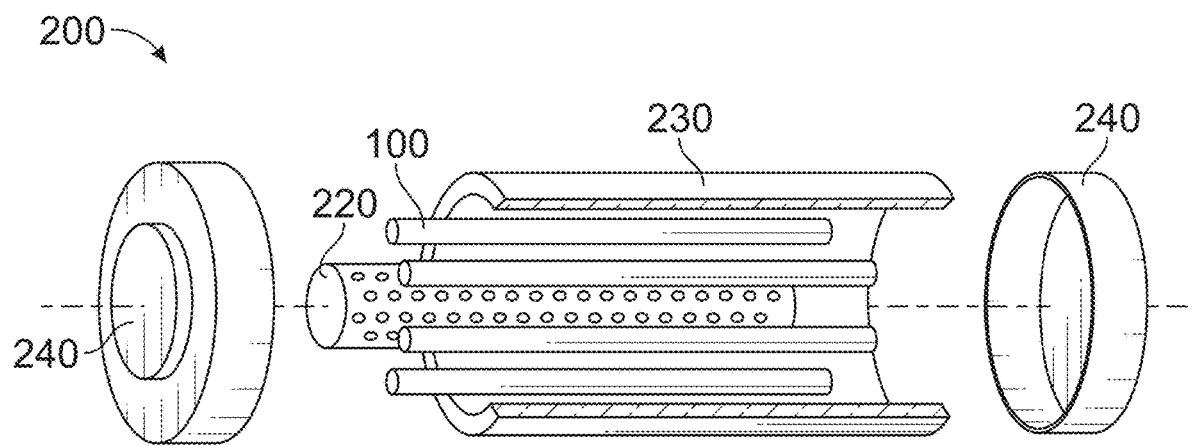
FIG. 2B is a simplified exploded perspective side view of a configuration of a reactor system according to the embodiment of FIG. 2A.
Figure 3A:
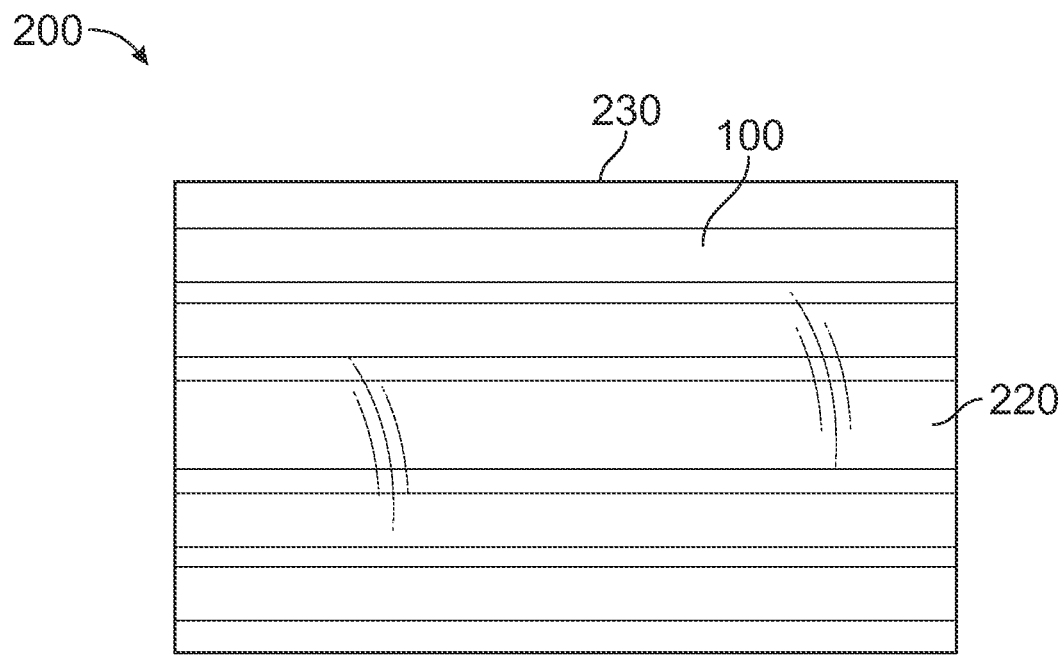
FIG. 3A is simplified cross-sectional side view of an example configuration of the reactor cell according to one embodiment of the disclosure.
Figure 3B:
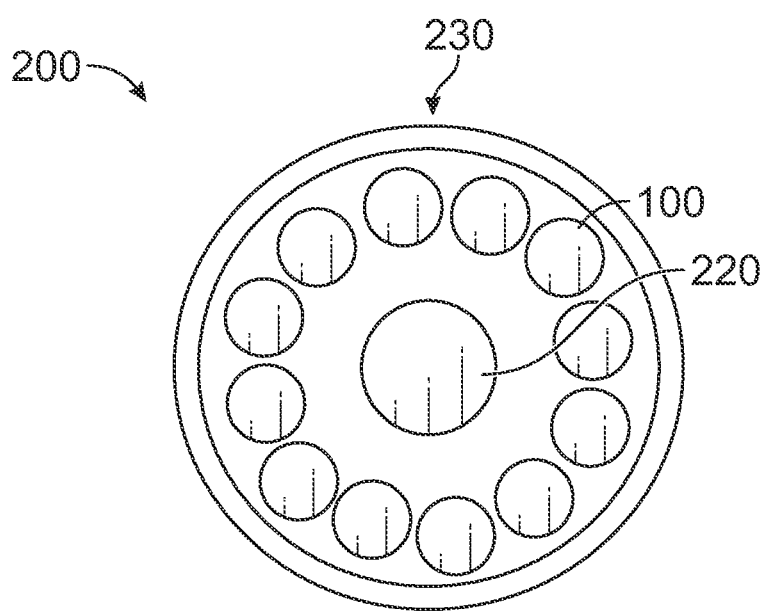
FIG. 3B is a simplified cross-sectional end view of an example configuration of the reactor cell according to the embodiment of FIG. 3A.
Figure 4A:
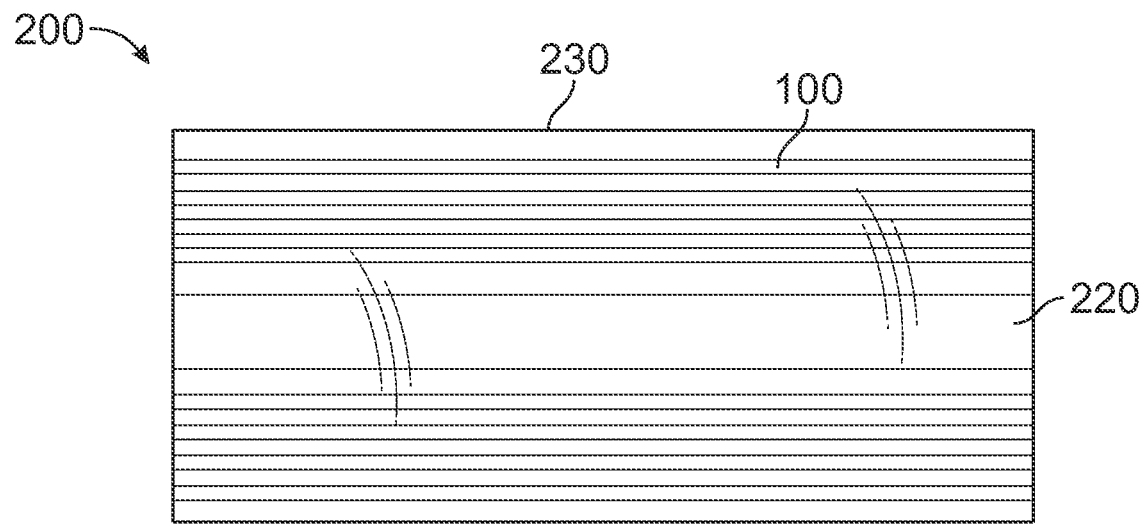
FIG. 4A is a simplified cross-sectional side view of an example configuration of the reactor cell according to one embodiment of the disclosure.
Figure 4B:
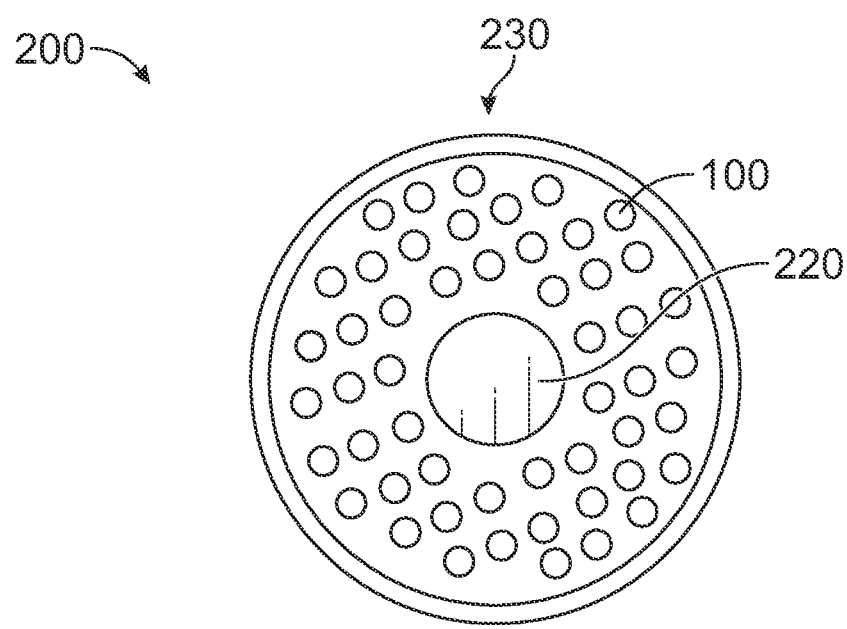
FIG. 4B is a simplified cross-sectional end view of an example configuration of the reactor cell according to the embodiment of FIG. 4A.
Figure 5A:
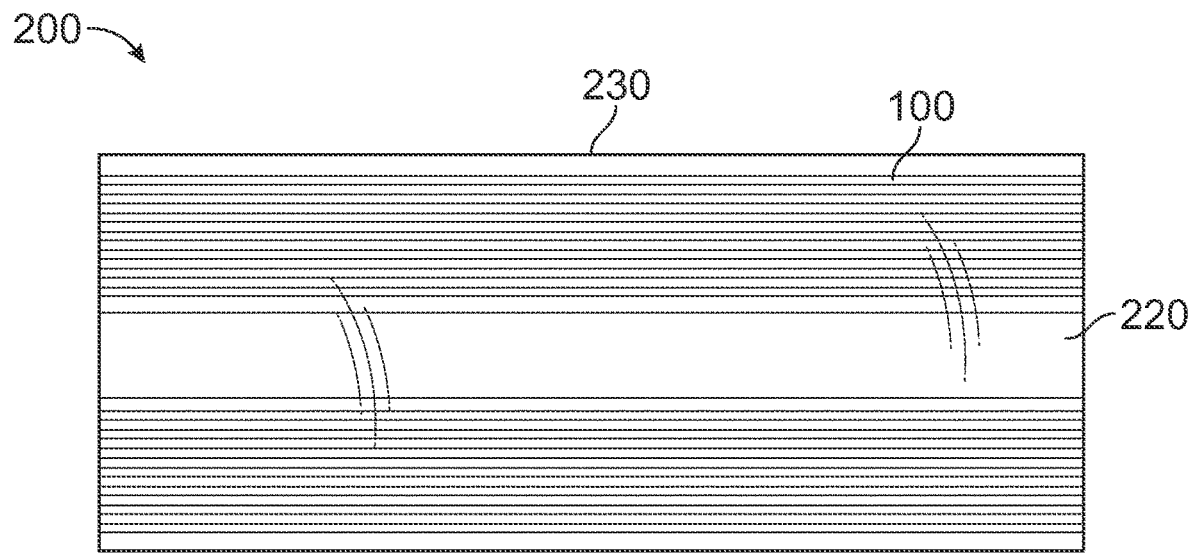
FIG. 5A is a simplified cross-sectional side view of an example configuration of the reactor cell according to one embodiment of the disclosure.
Figure 5B:
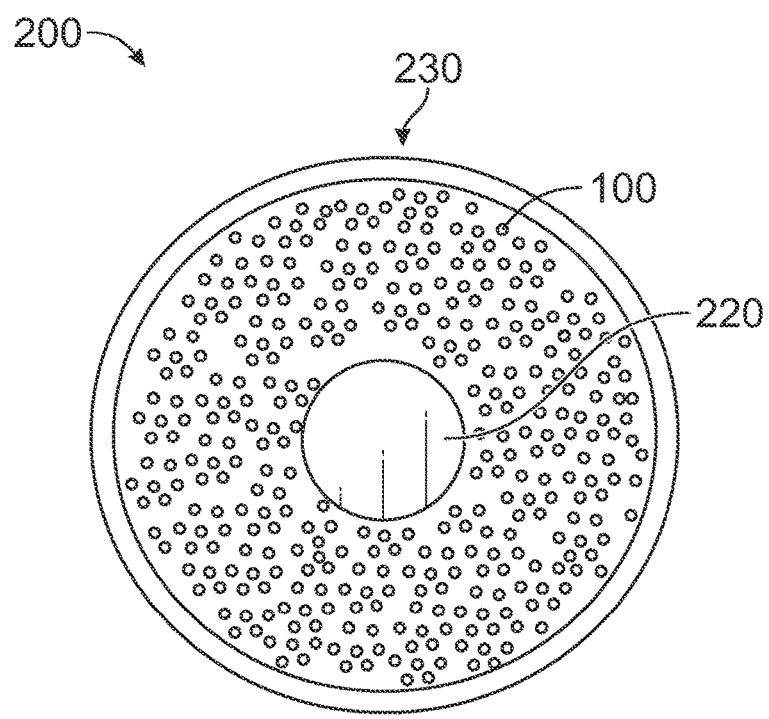
FIG. 5B is a simplified cross-sectional end view of an example configuration of the reactor cell according to the embodiment of FIG. 5A.

In view of the present disclosure, the processes and active materials described herein can be configured by the person of ordinary skill in the art to meet the desired need. In general, the disclosed systems, methods, and apparatus provide improvements in photocatalysis processes and materials, such as improvements in the energy efficiency thereof. In general, the reactor system is designed to allow for illumination of the reactor cells with a light source, which itself may be comprised of one or more individual light sources. One embodiment of the reactor system of the disclosure is shown in perspective view in FIG. 2A. The same reactor system 200 elements are also shown in exploded view in FIG. 2B. In this embodiment, at least one reactor cell 100 and at least one light source 220 are disposed within reactor housing 230. The reactor system 200 further comprises reactor fittings 240 that may be further coupled to another system (e.g., another system used for reforming reactions). Several other embodiments of the reactor system of the disclosure are shown in FIGS. 3A-3B, 4A-4B, 5A-5B, 7A-7D, 8, 16A-16B, and 17A-17B. In some embodiments, as shown in FIGS. 7A-7D, 16A-16B, and 17A-17B, the reactor system may have several light sources, light management features, and/or thermal management features, as described in further detail with respect to FIGS. 7A-7D and 9-18.

In one embodiment, the reactor fittings 240 may comprise a reactor fluid distributor (for input) and a reactor fluid accumulator (for output). Any reactor fluid distributor or accumulator known in the art might be used. For example, the reactor fluid distributor or accumulator may be similar to those disclosed in U.S. Pat. No. 4,788,040 (incorporated by reference herein), where the orifices of the reactor fluid distributor and accumulator will match to the arrangement of the reactor cells. In some embodiments, the interior surfaces (i.e. facing the reactor cells) of the reactor fluid distributor and/or accumulator may be reflective.

In one embodiment, the at least one light source may be elongated and arranged coaxially along a central long axis of the housing. In further embodiments, the at least one light source may include at least one LED, metal halide bulb, high pressure sodium bulb, xenon lamp, incandescent bulb, fluorescent bulb, halogen bulb, HID, laser or combination thereof. In a further embodiment, the at least one light source may include at least one corn cob LED bulb having a plurality of LEDs arranged along its length. In another embodiment, the at least one light source is a planar array of LEDs arranged in rows and columns to have a width and height similar to that of the reactor cell 100, or at least the portion of the reactor cell 100 in which the photocatalysis takes place.

In another embodiment, the at least one reactor cell may be elongated and may have a circular cross-section. In this embodiment, the at least one reactor cell may be arranged parallel to or even coaxial with the at least one light source. For example, in a further embodiment, the at least one light source may be arranged coaxially in the housing and the at least one reactor cell includes a plurality of reactor cells arranged surrounding the at least one light source.

In one embodiment, the housing has a circular or a regular polygonal cross-section. In one embodiment, the housing may have an inner diameter ranging from about 12 cm to about 128 cm. The housing may further have an inner diameter ranging from about 24 cm to about 72 cm. Each of the plurality of reactor cells has a diameter ranging from about 2 cm to about 4 cm, according to one embodiment. The plurality of reactor cells ranges in number from 12 cells to 24 cells, for example.

In another embodiment, the housing may have an inner diameter ranging from about 12 cm to about 18 cm. Each of the plurality of reactor cells shown in FIGS. 4A-4B may have a diameter of about 2 cm, and the plurality of reactor cells may range in number from 50 cells to 100 cells, for example. In a further embodiment, shown in FIGS. 5A-5B, the plurality of reactor cells may each have a diameter of about 1 cm, and the plurality of reactor cells includes at least 100 reactor cells, for example.

Figure 7A:
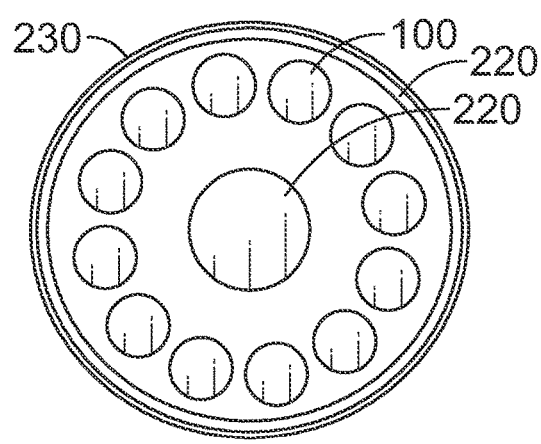
FIG. 7A is a simplified cross-sectional end view of an example configuration of a reactor cell system according to one embodiment of the disclosure.
Figure 7B:
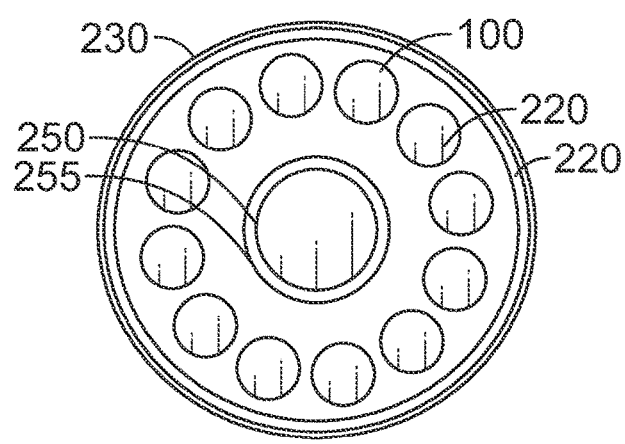
FIG. 7B is a simplified cross-sectional end view of an example configuration of a reactor cell system according to one embodiment of the disclosure.
Figure 7C:
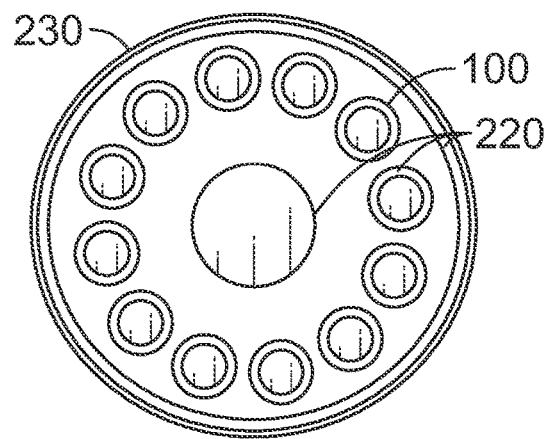
FIG. 7C is a simplified cross-sectional end view of an example configuration of a reactor cell system according to one embodiment of the disclosure.
Figure 7D:
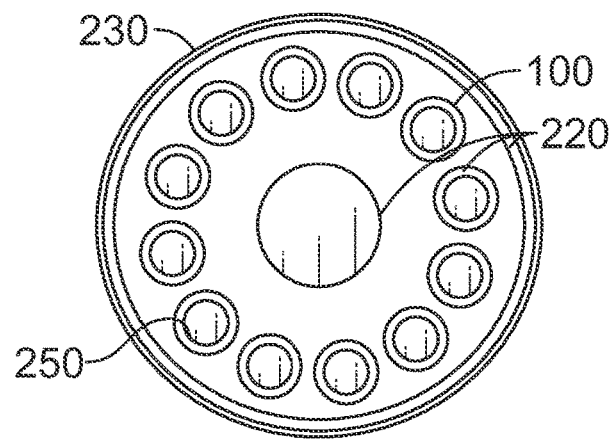
FIG. 7D is a simplified cross-sectional end view of an example configuration of a reactor cell system according to one embodiment of the disclosure.

In one embodiment, shown in FIG. 7B, the reactor system includes at least one shaft 255 that is arranged coaxially within the housing. The at least one shaft may have a reflective exterior surface. In this embodiment, a plurality of reactor cells and a plurality of light sources are arranged parallel to and surrounding the at least one shaft, such as in an alternating arrangement. In a further embodiment, the at least one shaft 255 may have a cavity having an input at a first end and an output at a second end such that the at least one shaft 255 is configured to permit fluid to flow there through for thermal management of the reactor system, in which case the fluid would constitute at least part of the thermal management feature 250. In an alternative embodiment, the at least one shaft comprises a metal rod and or metal wires configured for heat conduction.

In another embodiment, the reactor system has a housing with an interior surface coupled to at least one light source. The reactor system further has at least one reactor cell disposed within an interior of the housing. The at least one reactor cell includes an enclosure and a plasmonic photocatalyst on a catalyst support disposed within the at least one enclosure. The enclosure is optically transparent and includes at least one inlet for a reactant to enter the at least one reactor cell and at least one outlet for a reformate to exit the at least one reactor cell. The reactor system may include at least one shaft having a reflective exterior surface that is disposed within the housing. In one embodiment, the at least one shaft is arranged coaxially within the housing.

Solar Light Source

In some embodiments, the light source is a solar light source. For example, the light source may include electromagnetic radiation from the sun, another star, or any other light-emitting celestial body. In such a case, the reactor system may comprise a solar concentrator to provide light energy to a photocatalytic reactor cell, which may be part of a reactor system comprising many such photocatalytic reactor cells.

A reactor system utilizing a solar light source may comprise a solar concentrator, such as a reflector or refractor, and a photocatalytic reactor cell positioned relative to the solar concentrator to increase an incidence of electromagnetic radiation on the photocatalytic reactor cell. According to one example, the solar concentrator comprises a reflector, such as a parabolic mirror trough, a parabolic dish, a Fresnel reflector, a Compact Linear Fresnel Reflector (CLFR), a solar power tower, a flat plate collector, an evacuated tube collector, or another type of reflector. According to another example, the solar concentrator comprises a refractor, such as a lens (e.g. a Fresnel lens).

Figure 8:
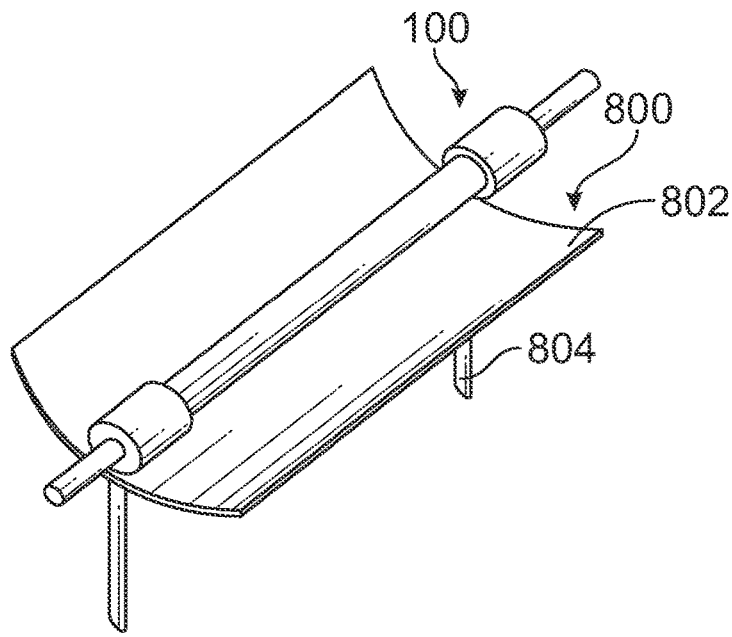
FIG. 8 is a simplified perspective view of an example configuration of a reactor system having a solar concentrator according to one embodiment of the disclosure.

FIG. 8 illustrates one example embodiment, in which the solar concentrator is a parabolic mirror trough 800. As shown, the parabolic mirror trough 800 comprises a parabolically-shaped mirrored surface 800, curved to mathematically define a focal line to which incoming electromagnetic radiation from the sun (or other light source) reflects. The parabolic mirror trough 800 also comprises an attachment mechanism 804, such as a stand, frame, base, or other means for attaching the parabolic mirror trough 800 to an object, such as the Earth (including an object on the Earth), a vehicle, a celestial body, or a satellite, for example. The photocatalytic reactor cell is positioned to be substantially aligned along its central axis (i.e. its long axis, for an elongated cylindrical cell) to the focal line of the parabolic mirror trough.

While FIG. 8 illustrates only a single parabolic mirror trough 800 with a single photocatalytic reactor cell 100, in some embodiments, there may be more than one parabolic mirror trough with a single photocatalytic reactor cell (positioned to be substantially aligned along its central axis to a focal line of at least one of the plurality of parabolic mirror troughs), a single parabolic mirror trough with more than one photocatalytic reactor cell (positioned to be substantially parallel along their central axes to a focal line of the parabolic mirror trough), or multiple parabolic mirror troughs with multiple photocatalytic reactor cells (each positioned to be substantially parallel along its central axis to a focal line of at least one of the plurality of parabolic mirror troughs).

As an alternative to the parabolic mirror trough 800 illustrated in FIG. 8, the solar concentrator may comprise a parabolic dish, with the photocatalytic reactor cell positioned substantially at a focal point of the parabolic dish. The parabolic dish may, for example, comprise a plurality of reflective dish portions disposed adjacent to other respective reflective dish portions to form an array.

As another alternative, the solar concentrator may comprise a Fresnel reflector, where the photocatalytic reactor cell is positioned to be substantially aligned along its central axis to a focal line of the Fresnel reflector. The Fresnel reflector may comprise a Compact Linear Fresnel Reflector (CLFR), for example.

As yet another example, the solar concentrator may comprise a solar power tower configured to receive focused electromagnetic radiation from an array of movable reflectors. In such a configuration, the photocatalytic reactor cell is positioned in the solar power tower at a focal point of the array of movable reflectors, according to one embodiment.

Other solar concentrator embodiments utilizing reflectors may also be used. A flat plate collector and/or an evacuated tube collector may possibly be used in some implementations.

As an alternative to a reflector implementation for the solar concentrator, a refractor may be used. For example, the solar concentrator may comprise a refractive lens, with the photocatalytic reactor cell positioned at a focal point of the refractive lens. For example, the solar concentrator may comprise a Fresnel lens, where the photocatalytic reactor cell is positioned at a focal point of the Fresnel lens.

In the above-described embodiments, the particular solar concentrating and/or focusing elements, such as the parabolic mirror trough 800 and others, may constitute a housing or at least a portion of the housing, as otherwise described herein. As an alternative, such solar concentrating and/or focusing elements may reside within a separate housing, such as one that is at least partially optically transparent.

For each of the solar light source embodiments described above, the solar concentrator may be advantageously oriented to substantially maximize an intensity of electromagnetic radiation incident normal to the solar concentrator. In one embodiment, the length of the solar concentrator is aligned along a north-south orientation, and the reactor system may further comprise a computer-controlled solar tracking system to orient the solar concentrator to maintain an optimized angle of incidence of the electromagnetic radiation to the solar concentrator. In general, any of the solar concentrator alternatives described above may be controlled to track motion of the sun (or other light source) to substantially maximize an intensity of electromagnetic radiation incident normal to the solar concentrator.

Figure 1A:
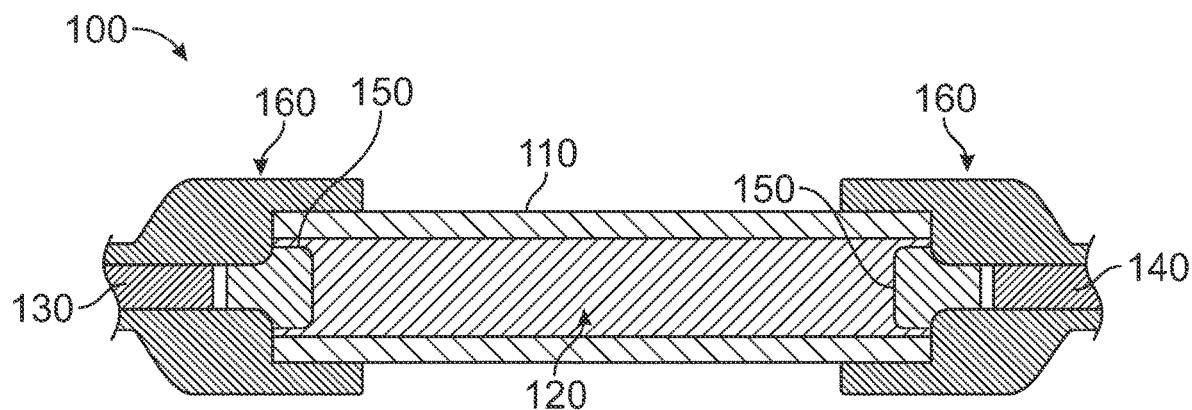
FIG. 1A is a simplified cross-sectional side view of a reactor cell according to one embodiment of the disclosure.

For at least some of the solar light source embodiments described above, the photocatalytic reactor cell may advantageously have at least a portion of an interior surface of the enclosure be reflective (e.g. mirrored) in order to reflect received light back into the catalyst support 120 (see, e.g., FIG. 1A). For example, an inner/interior surface of the photocatalytic reactor cell enclosure may be mirrored opposite to the solar concentrator from the photocatalytic reactor cell. The enclosure of the photocatalytic reactor cell should be largely optically transparent, though, at least in a direction toward the solar concentrator.

While several solar light source implementations for a reactor have been described, others are possible and are intended to be within the scope of the appended claims. Moreover, the embodiments described above may have applications with light sources other than the sun, including both natural and artificial (i.e. electric) light sources.

Example Reactor Cell Construction and Configuration

As noted above, the reactor system comprises one or more reactor cells. Some of the reactor cells disclosed herein comprise an optically transparent enclosure comprising at least one inlet and at least one outlet, and one or more plasmonic photocatalysts on a catalyst support disposed within the enclosure. Other reactor cells disclosed herein (e.g. those having an internal light source) may not have an optically transparent enclosure, but have at least one inlet and at least one outlet, and one or more plasmonic photocatalysts on a catalyst support disposed within the enclosure. Typically, the plasmonic photocatalyst comprises a catalyst coupled to a plasmonic material, such as through a physical, electronic, thermal, or optical coupling. The reactor cells of the disclosure are configured, upon application of a light source, to transform at least one reactant into at least one reformate.

In traditional fixed bed reactors, the catalyst beds are not optically transparent (i.e., the light does not penetrate the catalyst bed). In contrast, according to some embodiments of the disclosure, at least the support is optically transparent. In other embodiments, the reactor cells of the disclosure additionally or alternatively comprise an enclosure that is optically transparent. In some embodiments, the optically transparent enclosure has at least 50% transmittance for a predetermined light wavelength. For example, in some embodiments, the optically transparent enclosure has between about 50% to about 100% transmittance for a predetermined light wavelength; or at least 55%, or at least 60%, or at least 70%, or at least 80%, or at least 90%, or at least 95%, or even at least 98% transmittance for a predetermined light wavelength.

Advantageously, the optically transparent enclosure according to some embodiments of the disclosure may have low thermal expansion. Thus, in one embodiment, the optically transparent enclosure comprises a material having less than about $1 \times 10^{-4}/°$ K linear coefficient of thermal expansion (CTE). In another embodiment, the optically transparent enclosure comprises a material having less than about $1 \times 10^{-5}/°$ K CTE; or less than about $5 \times 10^{-6}/°$ K CTE; or less than about $3 \times 10^{-6}/°$ K CTE; or even less than about $1 \times 10^{-6}/°$ K CTE. For example, some exemplary materials with suitable CTE values include, but are not limited to, borosilicate glass at $3.2 \times 10^{-6}/°$ K, PYREX® glass at $3.2 \times 10^{-6}/°$ K, quartz at about $0.59 \times 10^{-6}/°$ K to about $9 \times 10^{-6}/°$ K, sapphire at $5.3 \times 10^{-6}/°$ K, and fused silica at $0.55 \times 10^{-6}/°$ K.

One of skill in the art will recognize than any material having the desired transmittance for a predetermined light wavelength (or range of wavelengths) and/or coefficient of thermal expansion (CTE) may be used. In some embodiments, the optically transparent enclosure comprises glass, borosilicate glass, quartz, fused quartz, aluminosilicate glass, lithium-aluminosilicate glass, sapphire, or combinations thereof.

In one embodiment, the optically transparent enclosure of the reactor cell is optically transparent on all sides of the enclosure. But one of skill in the art would appreciate that, in one embodiment, the optically transparent enclosure may not be optically transparent on all sides of the enclosure. For example, the outer cavity of the optically transparent enclosure may comprise a reflective surface facing the central cavity (which may be optically transparent).

Plasmonic Photocatalysts

The reactor cells of the disclosure also include one or more plasmonic photocatalysts comprising a catalyst coupled to a plasmonic material, such as through a physical, electronic, thermal, or optical coupling. Without being bound by theory, the plasmonic material is believed to act as an optical antenna capable of absorbing light due to the unique interaction of light with plasmonic materials and, as a result, generates a strong electric field on and near the plasmonic material (i.e., as a result of collective oscillation of electrons within the plasmonic material). This strong electric field on or near the plasmonic material allows for coupling between the catalyst and the plasmonic material, even when the catalyst and the plasmonic material are separated by distances of up to about 20 nm or more.

In general, the plasmonic material may be any metal, metal alloy, metalloid element, or its alloy. In some embodiments, the plasmonic material of the disclosure is selected from gold, gold alloy, silver, silver alloy, copper, copper alloy, aluminum, or aluminum alloy. In the present disclosure the term "alloys" is intended to cover any possible combination of metals. For example, the alloys may be binary alloys such as AuAg, AuPd, AgPd, AuCu, AgCu, etc., or they may be ternary alloys, or even quaternary alloys.

In some embodiments, the plasmonic material of the disclosure comprises an oxide shell surrounding a non-oxidized core. In one or more embodiments, the oxide shell may be a natural/native oxide shell that forms upon a metal or alloy's exposure to air or water. For example, a copper plasmonic material may possess a copper oxide (e.g., CuO or $Cu_2O$) shell surrounding a copper core, or an aluminum plasmonic material may possess an aluminum oxide shell surrounding an aluminum core. In some embodiments, the oxide shell may be at least partially artificially produced, such as by artificially increasing the thickness of a native/natural oxide shell by appropriate chemical methods, or by chemically synthesizing, or otherwise depositing, an oxide material around a pre-formed plasmonic material. In some embodiments, the oxide shell may have a thickness of up to about 30 nm, or up to about 25 nm, or up to about 15 nm. In some embodiments, the oxide shell may have a thickness of at least about 0.5 nm, or at least 1 nm, or at least 1.5 nm. In some embodiments, the oxide shell has a thickness ranging from about 0.1 nm to about 5 nm; or from about 0.1 nm to about 30 nm; or from about 1 nm to about 5 nm; or from about 1 nm to about 30 nm.

One of skill in the art will recognize that the size, shape, and chemical structure of the plasmonic material will affect the absorption of one or more target wavelengths. Thus, the plasmonic material or materials may be designed to maximize absorption of a target wavelength (or a set or range of target wavelengths, such as to recognize the target wavelength but have the material absorb relatively less of other, non-target wavelengths. In another example, the plasmonic material of the disclosure may be designed to catalyze a desired chemical reaction. Thus, in some embodiments, the plasmonic material may have a plasmon resonant frequency, or optical absorption maximum, in the ultraviolet to infrared region of the electromagnetic spectrum. In some embodiments, the plasmonic material has a plasmon resonant frequency in the visible light spectrum (such as at a wavelength ranging from about 380 nm to about 760 nm).

In general, the catalyst material coupled to the plasmonic material may be any compound capable of catalyzing a desired reaction (e.g., even if it were not coupled to a plasmonic material). For example, the catalyst may be capable of oxidation and reduction chemistry, water or air pollution remediation reactions, $NO_x$ and $N_2O$ decompositions, catalyzing hydrogenation reactions such as acetylene hydrogenation, carbon dioxide conversion to carbon monoxide via the reverse water-gas shift reaction (which can be coupled with a hydrogenation to create hydrocarbons using FisherTropsch synthesis), and nitrogen activation chemistry, including the synthesis of ammonia. In some embodiments, the catalyst of the disclosure may be any metal or metalloid element, and any alloy, oxide, phosphide, nitride, or combination thereof of said elements. For example, the catalyst of the disclosure may comprise catalytically active palladium, platinum, ruthenium, rhodium, nickel, iron, copper, cobalt, iridium, osmium, titanium, vanadium, indium, or any combination thereof. The catalyst of the disclosure may comprise any alloy, oxide, phosphide, or nitride of catalytically active palladium, platinum, ruthenium, rhodium, nickel, iron, copper, cobalt, iridium, osmium, titanium, vanadium, or indium. In some embodiments, the catalyst of the disclosure comprises catalytically active iron or copper.

In some embodiments, the catalyst of the disclosure may be intermetallic nanoparticles, core-shell nanoparticles, or semiconductor nanoparticles (e.g., $Cu_2O$).

In some embodiments, the catalyst may be physically attached to the plasmonic material, while in other embodiments the catalyst may be separated by a small distance from the plasmonic material (but still coupled thereto, such as through a physical, electronic, thermal, or optical coupling). The separation may be either by empty space (i.e., a distinct physical separation) or the separation may be by the thin oxide layer discussed above. For example, the plasmonic material and the catalyst may be separated by a small distance when they are prepared via lithographic methods to have a distinct physical separation. In one or more embodiments, the small separation may be a distance of up to about 30 nm, or up to about 25 nm, or up to about 15 nm. In some embodiments, the separation may be at least about 0.5 nm, or at least 2 nm, or at least 5 nm, or at least 10 nm. In some embodiments, one or more catalysts may be physically attached to the surface of a single plasmonic material, which can increase the surface area available for reactions. In some embodiments, the catalyst may form a shell that surrounds the plasmonic material.

The plasmonic photocatalysts may have a diameter ranging from about 5 nm to about 300 nm. In some embodiments, the plasmonic photocatalyst of the disclosure may have a diameter ranging from about 10 nm to about 300 nm; or about 50 nm to about 300 nm; or about 80 nm to about 300 nm; or about 100 nm to about 300 nm; or about 5 nm to about 250 nm; about 10 nm to about 250 nm; or about 50 nm to about 250 nm; or about 80 nm to about 250 nm; or about 100 nm to about 250 nm; or about 5 nm to about 200 nm; about 10 nm to about 200 nm; or about 50 nm to about 200 nm; or about 80 nm to about 200 nm; or about 100 nm to about 200 nm; or about 80 nm to about 200 nm.

The reactor cells according to at least some embodiments also include one or more plasmonic photocatalysts dispersed onto a catalyst support. As with the enclosure, in some embodiments, the catalyst support has a low absorbance, and in particular, a low enough absorbance (for the particular radiation wavelength or wavelength range) that the reactants are exposed to a sufficient amount of radiation to result in the desired catalytic effect for the particular reactor cell geometry in use.

Figure 6:
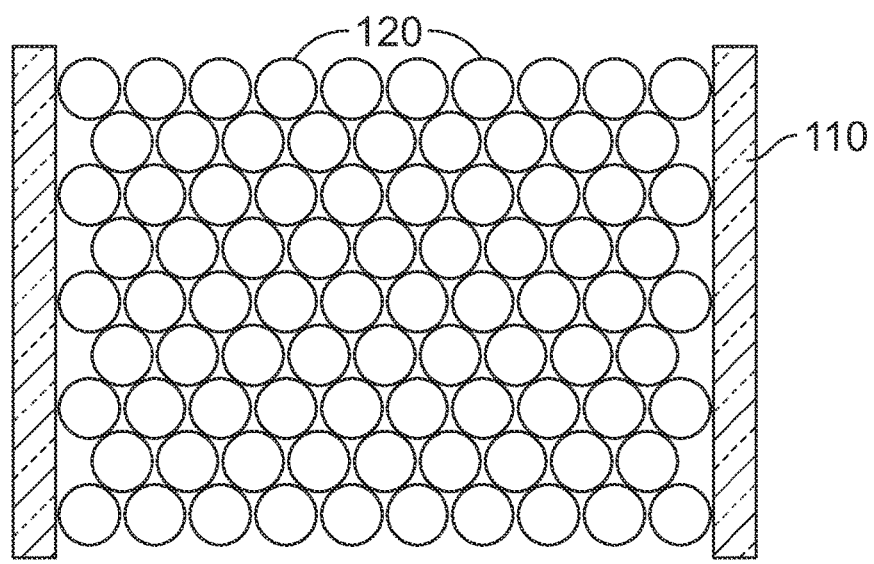
FIG. 6 is a simplified cross-sectional detail view of an example configuration of the reactor cell having a catalyst support in bead form.

One of skill in the art will recognize that any material having the desired absorbance or transmittance for a predetermined light wavelength (or set or range of wavelengths) may be used for the catalyst support. In some embodiments, the catalyst support of the disclosure comprises silica, quartz, fused quartz, glass, borosilicate glass, aluminosilicate glass, lithium-aluminosilicate glass, sapphire, diamond, or combinations thereof. The catalyst support may be in any form known in the art, such as in the form of beads, microporous beads, fibers, spheres, pellets, cylinders (hollow or otherwise), honeycombs, or symmetrical or asymmetrical tri-quadrulobes (for example, using extrusion or tableting methods). For example, FIG. 6 illustrates a cross-sectional view of the catalyst support in the bead form. In some embodiments, the catalyst support of the disclosure may be an aerogel. Suitable aerogels include, but are not limited to, silicon dioxide aerogel, aluminum oxide aerogel, titanium dioxide aerogel, zirconium dioxide aerogel, holmium oxide aerogel, samarium oxide aerogel, erbium oxide aerogel, neodymium(III) oxide aerogel, or a combination thereof. In some embodiments, the catalyst support of the disclosure is a silicon dioxide aerogel. One of skill will recognize that when the support is an aerogel, the plasmonic photocatalyst may be dispersed throughout the aerogel (for example, the plasmonic photocatalyst may be embedded into the aerogel). In some embodiments, the catalyst support of the disclosure may be transparent aluminum oxide (such as α-phase aluminum oxide or γ-phase aluminum oxide).

The plasmonic photocatalyst may be present on the catalyst support in any amount suitable for the desired use. For example, the plasmonic photocatalyst may be present on the catalyst support in an amount between about 0.01 wt % and about 30 wt %; or about 0.01 wt % and about 80 wt %; or about 10 wt % and about 80 wt %; or about 0.01 wt % and about 70 wt %; or about 10 wt % and about 70 wt %. In some embodiments, the plasmonic photocatalyst may be present on the catalyst support in an amount between about 0.01 vol and about 30 vol %; or about 0.01 vol % and about 20 vol %; or about 10 vol % and about 50 vol %; or about 0.01 vol % and about 70 vol %; or about 10 vol % and about 70 vol %.

In some embodiments, the plasmonic photocatalyst may be present on the catalyst support as a thin coating on the outer surface of the support (e.g., as one or a few layers). In one or more embodiments, the plasmonic photocatalyst layer that is coated onto the support may be up to about 30 nm, or up to about 25 nm, or up to about 15 nm; or at least about 0.5 nm, or at least 2 nm, or at least 5 nm, or at least 10 nm; or between about 5 nm to about 300 nm; or about 10 nm to about 300 nm; or about 50 nm to about 300 nm; or about 80 nm to about 300 nm; or about 100 nm to about 300 nm; or about 5 nm to about 200 nm; about 10 nm to about 200 nm; or about 50 nm to about 200 nm; or about 80 nm to about 200 nm; or about 100 nm to about 200 nm; or about 80 nm to about 200 nm; or about 5 nm to about 100 nm; about 10 nm to about 100 nm; or about 50 nm to about 100 nm; or about 10 nm to about 50 nm; or about 1 nm to about 50 nm.

In some embodiments, the reactor cell comprises one plasmonic photocatalyst on the catalyst support disposed within the enclosure (e.g., one type of supported plasmonic photocatalyst would be disposed within the enclosure). In some embodiments, the reactor cell comprises two or more plasmonic photocatalysts on the catalyst support disposed within the enclosure (e.g., two or more different supported plasmonic photocatalysts would be disposed within the enclosure). Two or more plasmonic photocatalysts on the catalyst support may be provided, either mixed or in distinct layers. For example, each layer would have one type of supported plasmonic photocatalyst having a desired plasmon resonant frequency and/or a desired diameter. In a non-limiting example, one layer would absorb one desired wavelength range relative to other wavelengths, the next layer would absorb another wavelength range, and the final layer (e.g., an intermediate layer) would absorb other wavelengths, such as wavelengths outside the first and second wavelength ranges.

Figure 1B:
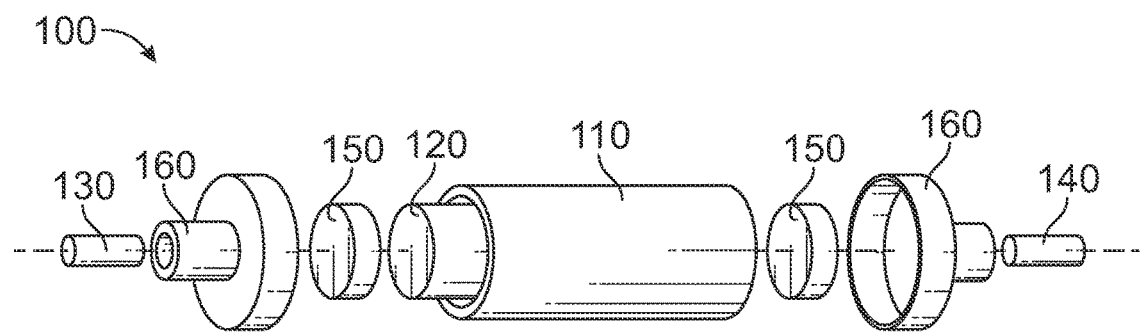
FIG. 1B is a simplified exploded perspective side view of a reactor cell according to one embodiment of the disclosure.

In general, the reactor cell is designed to allow for illumination of the plasmonic photocatalysts with a light source. One embodiment of the reactor cell of the disclosure is shown in cross-sectional view in FIG. 1A. The same reactor cell 100 elements are also shown in exploded view in FIG. 1B. Here, a reactor cell 100 is shown comprising a plasmonic photocatalyst on a catalyst support 120 disposed within an optically transparent enclosure 110. The reactor cell 100 may further comprise fittings 160 configured to attach the cell to at least one delivery channel for at least one reactant input 130 and at least one reformate output 140. The reactor cell 100 may further comprise one or more packing support elements 150 configured to retain the catalyst within the optically transparent enclosure 110.

The size and shape of the enclosure of the reactor cell may be adapted to meet the desired need. In some embodiments, the enclosure has an inner diameter ranging from about 0.2 cm to about 10 cm; or about 0.5 cm to about 3 cm. In some embodiments, the enclosure has a length ranging from about 10 cm to about 2 m; or about 50 cm to about 1 m. The enclosure of the reactor cell may have a circular cross-section or a polygonal cross-section, for example.

As noted above, the reactor cell may further comprise one or more fittings (such as fittings 160 in FIGS. 1A-1B) configured to attach the reactor cell to at least one delivery channel for delivering the at least one reactant to or the at least one reformate from the enclosure. For example, the fittings may comprise a first fitting coupled to the reactant input and a second fitting coupled to the reformate output. The fittings of the disclosure may comprise low alloy steel, high alloy steel, chrome alloys, nickel alloys, plastics, glass, borosilicate glass, quartz, fused quartz, aluminosilicate glass, lithium-aluminosilicate glass, or combinations thereof. Depending on the need, the fittings of the disclosure may further comprise an O-ring or another sealing mechanism. Other fitting materials and/or sealing mechanisms are also possible, and are intended to be within the scope of the present disclosure.

The reactor cell may further comprise one or more packing support elements (such as packing support elements 150 in FIGS. 1A-1B) configured to retain the catalyst within the enclosure. In some embodiments, the packing support elements are provided at the input end and at the output end of the reactor cell. In some embodiments, the packing support elements are provided at the input end, the output end, and spaced throughout the reactor cell. Conventional materials for use as a packing support may be used, such as metal mesh, glass beads (having a larger diameter than the support), glass wool, monolith, polymer, or elastomer, for example.

In some embodiments, the optically transparent enclosure further comprises an outer cavity and a central cavity arranged coaxially with the outer cavity, wherein the outer cavity contains the plasmonic photocatalyst on the catalyst support and the central cavity is configured to receive a light source or a thermal management feature. In some embodiments, the light source is disposed within the central cavity of the optically transparent enclosure. In some embodiments, the light source extends along or through a length of the enclosure. Any suitable light source may be used such as, but not limited to, LED, metal halide bulb, high pressure sodium bulb, xenon lamp, incandescent bulb, fluorescent bulb, halogen bulb, HID, laser or combination thereof. Natural light, such as solar light, may also be directed into the central cavity to serve as the light source. In some embodiments, the thermal management feature is disposed within the central cavity of the optically transparent enclosure. Any thermal management feature known in the art might be used. For example, the thermal management feature may include a fluid input coupled to a first end of the central cavity and a fluid output coupled to a second end of the central cavity such that fluid may flow through the reactor cell to add or remove heat from the reactor cell; or the thermal management feature may comprise a metal rod or metal wires configured for heat conduction.

In one alternative embodiment, neither the housing of the reactor system nor the enclosure of each reactor cell need be optically transparent. In this alternative embodiment, the reactor system comprises a housing and a plurality of reactor cells each having its own light source. Since, in this embodiment, each reactor cell has its own light source, the enclosure of each reactor cell need not be optically transparent, and may instead be reflective, in order to reflect light from the light source back into the interior of the enclosure. Each reactor cell may also include an inlet and an outlet, and each reactor cell includes at least one plasmonic photocatalyst on a catalyst support disposed within the enclosure, where the plasmonic photocatalyst comprises a catalyst coupled to a plasmonic material. The reactor system may further include a distributor for distributing at least one reactant into the plurality of reactor cells via the inlet of each reactor cell, and an accumulator for accumulating at least one reformate from the plurality of reactor cells via the outlet of each reactor cell.

Reactor Cells Having Light Management and/or Thermal Management Features

In general, the example reactor cells described in FIGS. 9-13 and 16 each comprise an enclosure having one or more surfaces to define an interior of the enclosure and an inlet and outlet for process gas, a photocatalyst bed disposed within the interior or the enclosure, and at least one light-management feature and/or thermal-management feature, details of which are set forth below. The photocatalyst bed may include a photocatalyst coupled to a plasmonic material, such as through a physical, electronic, thermal, or optical coupling. The reactor cells of the disclosure are configured, upon application of a light source, to transform at least one reactant into at least one reformate.

Figure 9:
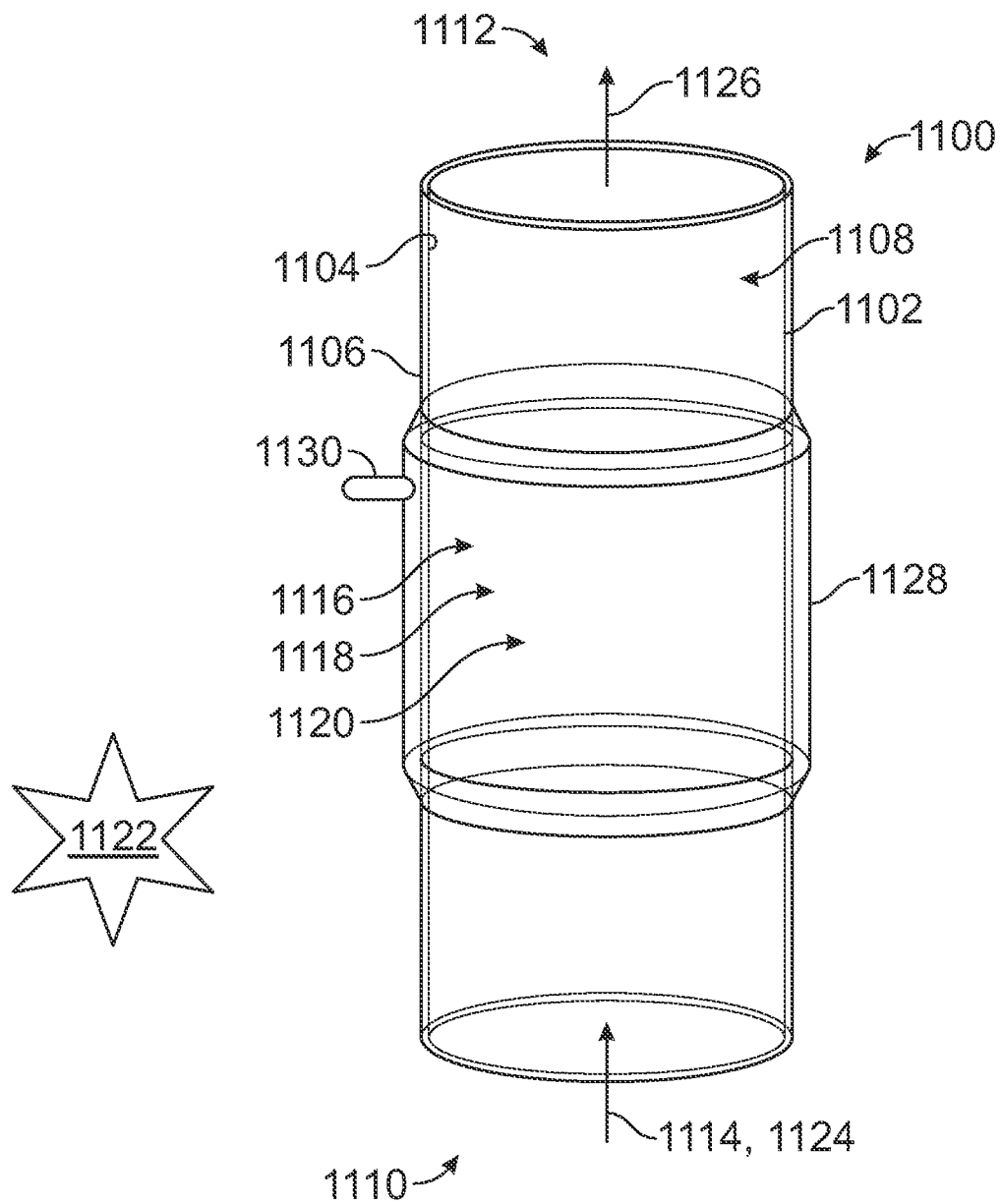
FIG. 9 is a simplified schematic diagram illustrating at least a portion of a reactor cell, according to an example embodiment.

FIG. 9 is a simplified schematic diagram illustrating at least a portion of a reactor cell 1100. The reactor cell 1100 may be utilized advantageously with an external light source (not illustrated in FIG. 9) to promote plasmonic photocatalytic reactions.

The reactor cell 1100 includes an enclosure 1102, which is comprised of an inner surface 1104 and an outer surface 1106. The inner surface 1104, in turn, defines an interior 1108 of the enclosure 1102. An inlet 1110 and an outlet 1112 are respectively used to feed-in and exit a process gas 1114. In the example illustrated, the enclosure 1102 is generally cylindrically shaped; however, other shapes alternatively may be utilized without departing from the intended scope of the technology set forth herein.

At least a portion of the interior 1108 of the enclosure 1102 includes a photocatalyst bed 1116. As described above, the photocatalyst bed 1116 comprises a photocatalyst 1118 coupled to a plasmonic material 1120, such that, upon application of a light source 1122, plasmonic photocatalysis is effected. In one example, the reactor cell 1100 may be used to convert reactant(s) 1124 into reformate(s) 1126. The enclosure 1102 is preferably substantially optically transparent to allow applied light to reach the photocatalyst bed 1116 at the interior 1108 of the enclosure 1102. The enclosure 1102 may be constructed of quartz, for example.

Also illustrated in FIG. 9 is a vacuum jacket 1128, which is an external vacuum jacket in the example shown. The vacuum jacket 1128 may be evacuated via one or more vacuum nipples 1130, which may be connected via tubing (not illustrated in FIG. 9) to one or more vacuum pumps (not illustrated in FIG. 9). The vacuum jacket 1128 may surround at least a portion of the enclosure 1102 to provide insulative properties in order to help maintain heat within the reactor cell 1100. In the example shown in FIG. 9, the vacuum jacket 1128 is shaped as a cylindrical sleeve (having a generally annular cross section) overlying the cylindrical enclosure 1102. Other shapes alternatively may be used for the vacuum jacket 1128, in order to conform generally to the shape of the enclosure 1102. In embodiments in which an external light source 1122 is used, the vacuum jacket 1128 and enclosure 1102 are preferably substantially optically transparent (e.g. constructed of quartz) to allow applied light to reach the photocatalyst bed 1116 at the interior 1108 of the enclosure 1102. Further details regarding the vacuum jacket are described below.

In some embodiments, the photocatalyst bed 1116 and the vacuum jacket 1128 extend across a similar or identical length of the enclosure 1102. This length may be defined by a portion of the cell 1100 over which incident light is applied, for example. In other embodiments, the photocatalyst bed 1116 extends further in one or more directions along the enclosure 1102 than the vacuum jacket 1128 extends. This second configuration may be beneficial to ensure light utilization by the catalyst bed (i.e. the longer catalyst bed substantially prevents light from escaping once inside the catalyst bed), resulting in potentially higher efficiency. Other configurations may also be utilized without departing from the scope of the technology described herein.

In addition, the enclosure 1102 may be provided with a mirrored coating (not illustrated in FIG. 9) over at least a portion of its outer surface 1106 and/or inner surface 1104, in order to further confine light within the interior 1108 of the enclosure 1102, to potentially further improve efficiency. For example, the mirrored coating may be provided at a portion of the enclosure 1102 that is not subjected to application of light from an external light source 1122, such as a portion of the enclosure 1102 that is not surrounded by the vacuum jacket 1128.

Figure 10:
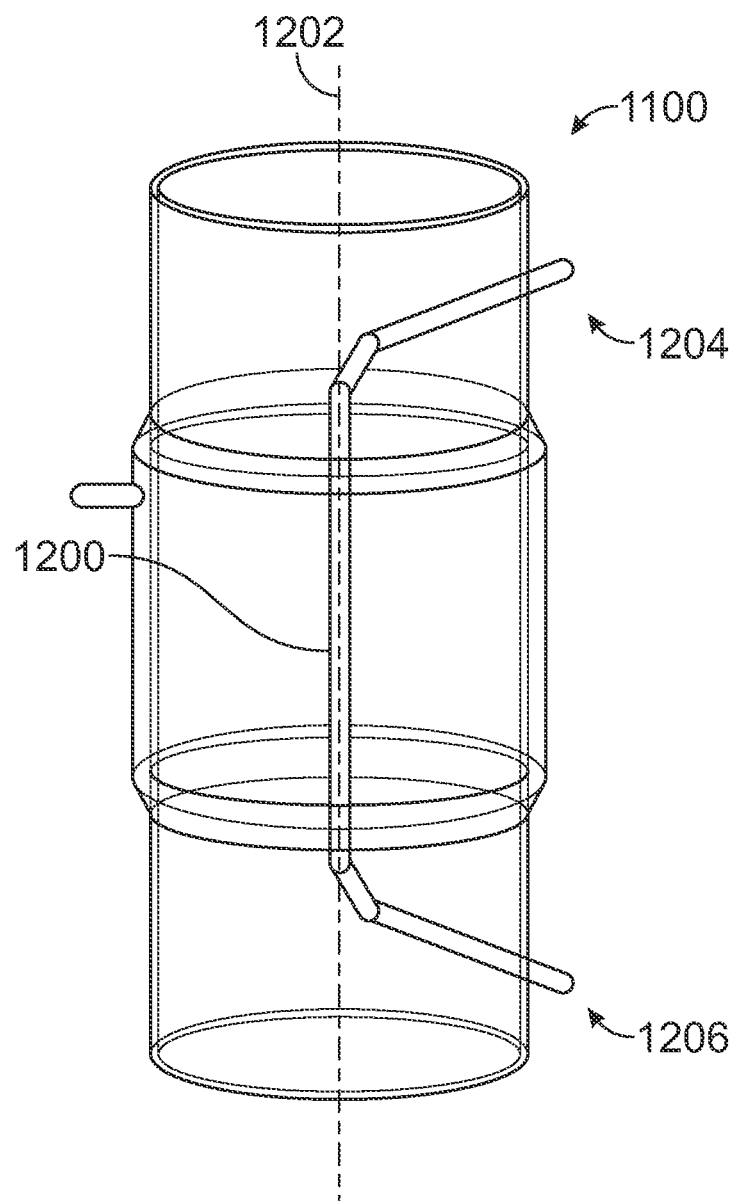
FIG. 10 is a simplified schematic diagram illustrating at least a portion of a reactor cell with a capillary tube, according to an example embodiment.

FIG. 10 illustrates the reactor cell 1100 of FIG. 9 with a capillary tube 1200 included to assist with thermal management. The capillary tube 1200 may extend generally along a central axis 1202 of the housing 1102, so that thermal management may be provided in the photocatalyst bed 1116. The capillary tube 1200 may include be used to provide heating, such as through a hot fluid or resistive heating coil, or cooling, such as through a cooling fluid or other cooling mechanism, for example. In some embodiments, the capillary tube 1200 has ends 1204 and 1206 that enter and exit the enclosure through one or more walls of the enclosure 1102, as defined by the inner surface 1104 and outer surface 1106. In such a configuration, the capillary tube 1200 does not interfere with the inlet 1110 and outlet 1112. Other configurations may alternatively be used for providing the capillary tube 1200 within the enclosure 1102. In some embodiments, more than one capillary tube 1200 is included to provide further thermal management capabilities.

Figure 11:
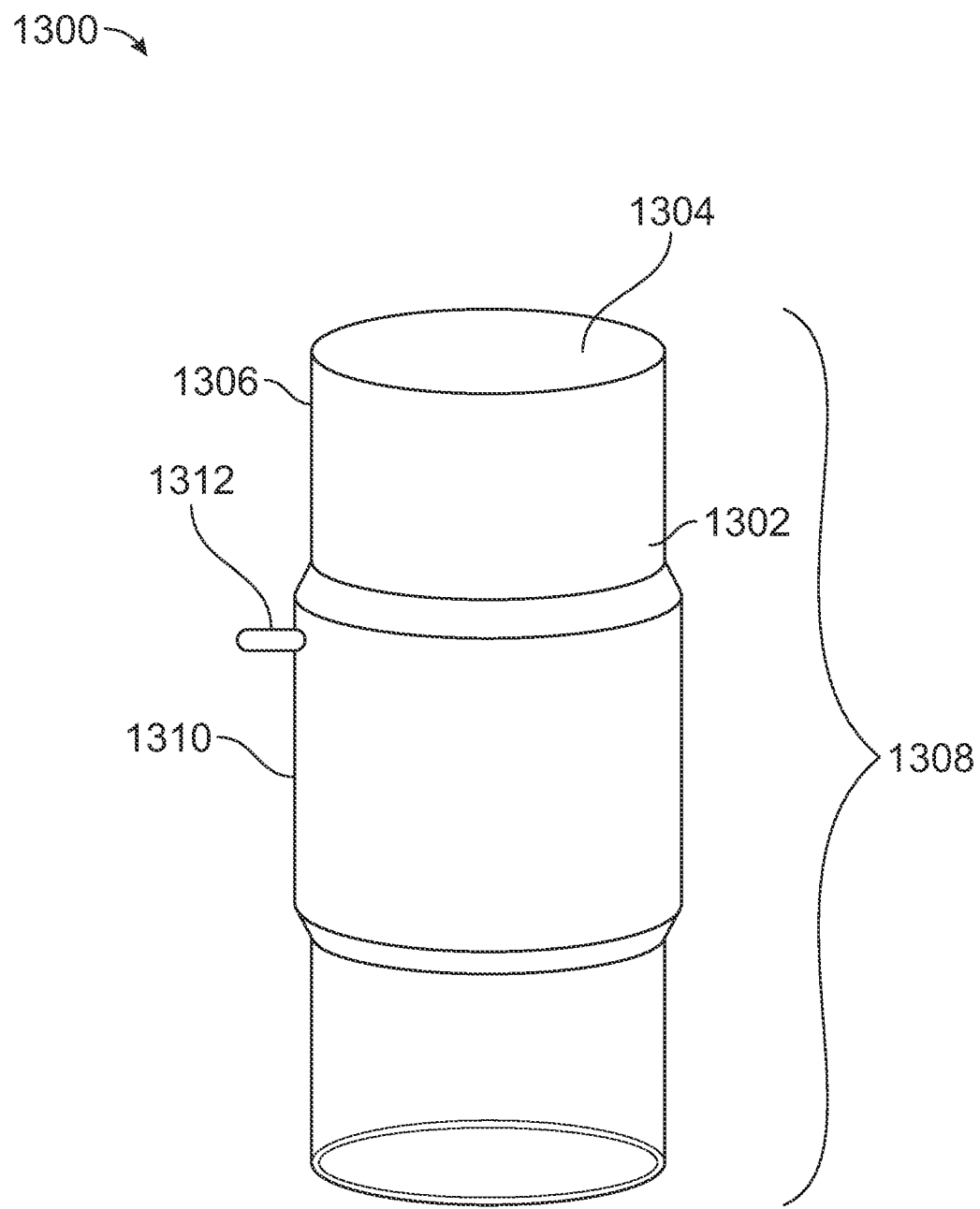
FIG. 11 is a simplified schematic diagram illustrating dimensions for an example reactor cell, according to an example embodiment.

FIG. 11 is a simplified schematic diagram (not necessarily to scale) for an example reactor cell 1300 in accordance with an embodiment of the technology described herein. The reactor cell 1300 includes an enclosure 1302, similar to the enclosure 1102 described with reference to FIG. 9. The enclosure 1302 includes an inner surface 1304 defining an inner diameter of 22 mm and an outer surface 1306 defining an outer diameter of 25 mm. The enclosure 1302 has a length 1308 (which may be about 250 mm, for example), a portion of which is surrounded by a vacuum jacket having a length of 100 mm, an inner diameter slightly larger than 25 mm (the outer diameter of the enclosure 1302), and an outer diameter defined by a thickness of the vacuum jacket 1310 (which may be about 3-5 mm, for example). A vacuum nipple 1312 is disposed within about 10 mm of the top (one end) of the vacuum jacket 1310. All of the dimensions described with respect to FIG. 11 are merely examples, and particular applications/environments (e.g. desired reactions, available light source(s), available heating/cooling) may benefit from dimensions different from what is described with respect to FIG. 11.

Figure 12:
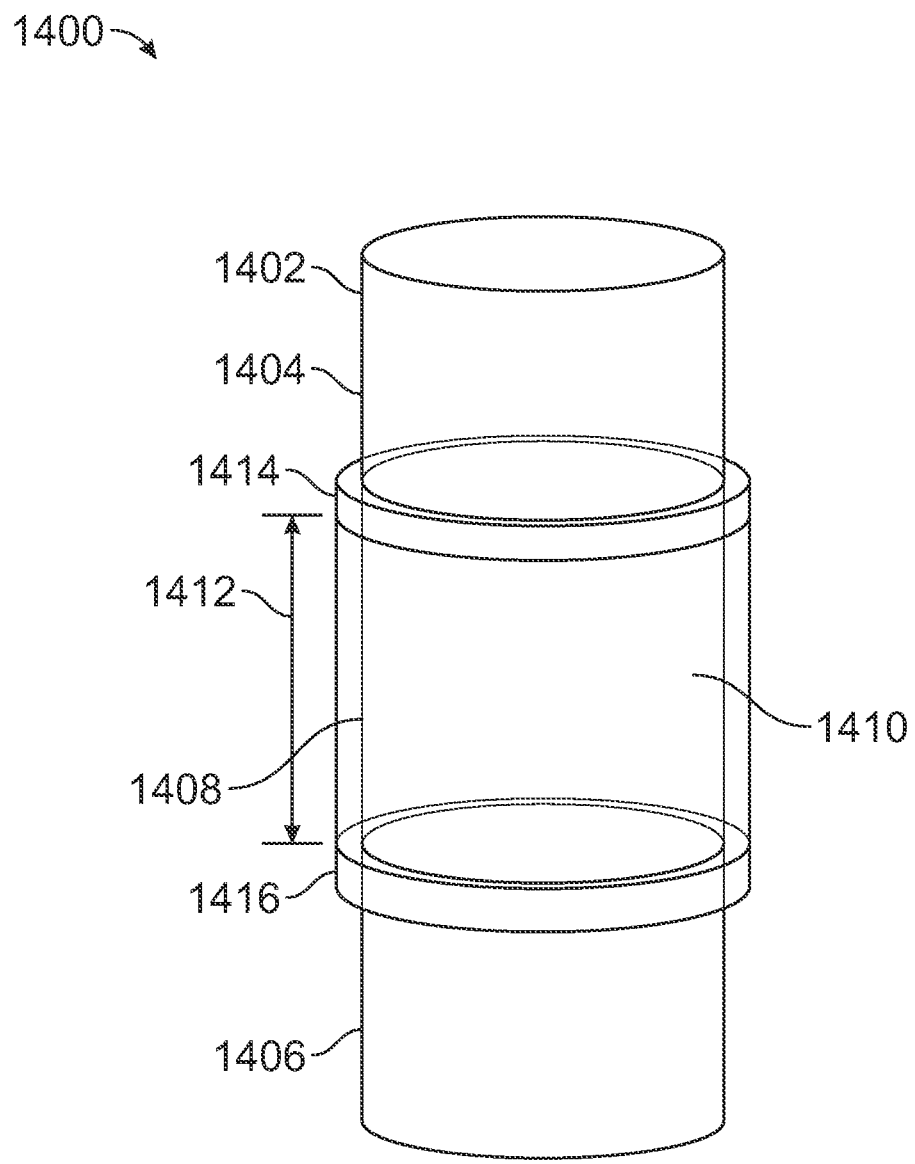
FIG. 12 is a simplified schematic diagram illustrating another example reactor cell, according to an example embodiment.

FIG. 12 is a simplified schematic diagram illustrating another example reactor cell 1400 in accordance with an embodiment of the technology described herein. The reactor cell 1400 differs from the reactor cells 1100 and 1300 in that the reactor cell 1400 has an enclosure 1402 comprised of a top portion 1404, a bottom portion 1406, and a central portion 1408. The central portion 1408 is optically transparent (e.g. glass) and contains a photocatalyst bed 1410 similar to the photocatalyst bed 1116 described above with reference to FIG. 9. An optically transparent vacuum jacket 1412 surrounds the central portion 1408 and allows externally applied light to reach the photocatalyst bed through the vacuum jacket 1412 and central portion 1408. In the example of FIG. 12, the vacuum jacket 1412 is constructed of glass and further includes top ring 1414 and bottom ring 1416 to assist in holding a desired vacuum provided via a vacuum pump (not shown) connected to the vacuum jacket 1412. To promote reflection of applied light, the top ring 1414 and bottom ring 1416 may be provided with an internally reflective coating to reflect any escaped light back into the photocatalyst bed 1410.

The top portion 1404 and/or bottom portion 1406 may be glass or metal tubing, for example. As was described above with reference to FIG. 9, a mirrored coating may be provided on the enclosure (e.g. the top portion 1404 and/or bottom portion 1406) over at least a portion of its outer surface and/or inner surface, in order to further confine light within the interior of the enclosure, to potentially further improve efficiency. In the case where the top portion 1404 and/or bottom portion 1406 is metal (and is not optically transparent), the top ring 1414 and/or bottom ring 1416 may respectively comprise an assembly that includes one or more glass-metal coupling fittings.

Figure 13:
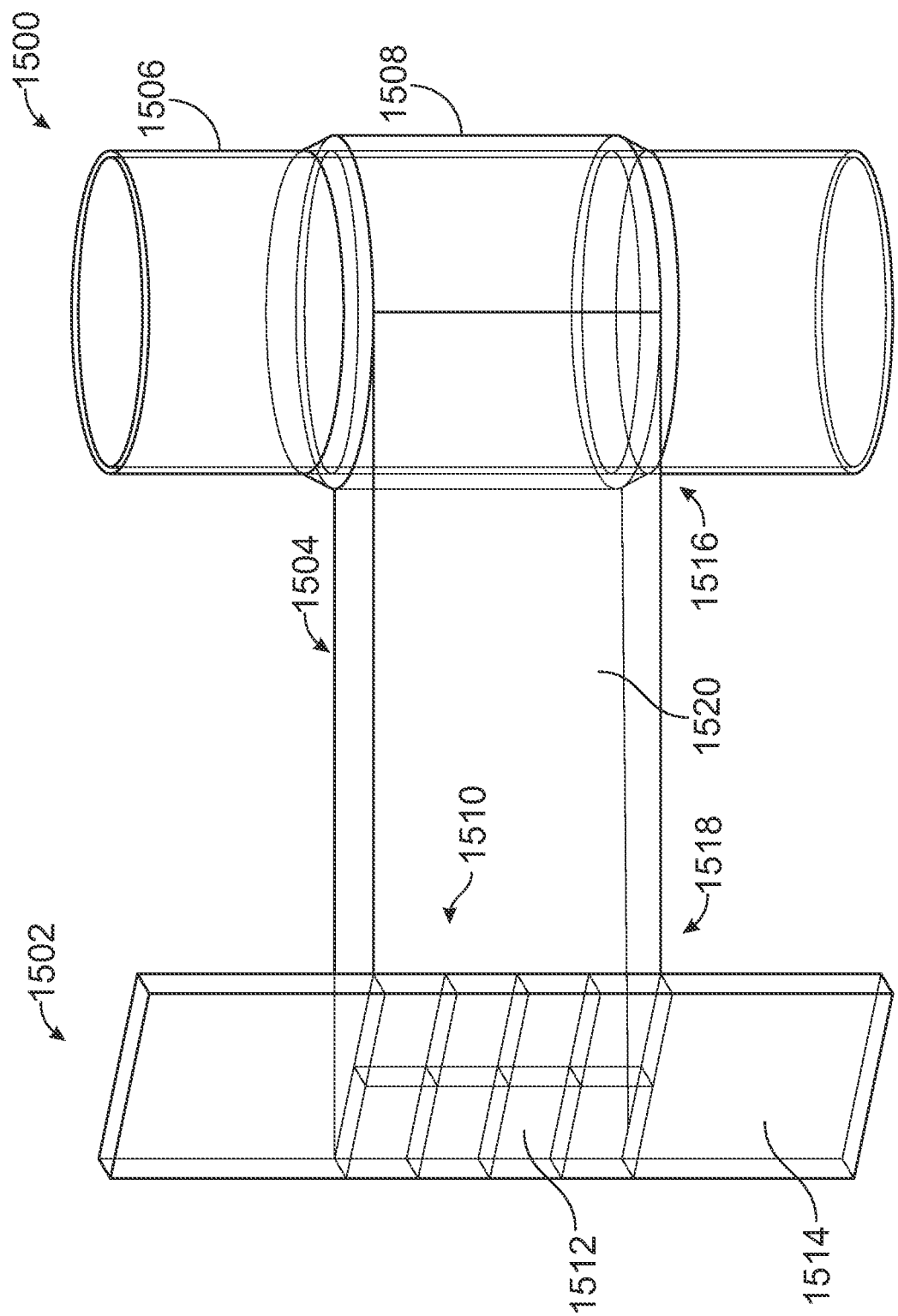
FIG. 13 is a simplified schematic diagram illustrating a reactor cell optically coupled to an external light source via an optical conduit, according to an example embodiment.

FIG. 13 is a simplified schematic diagram illustrating a reactor cell 1500 optically coupled to an external light source 1502 via an optical conduit 1504 to provide light to a photocatalyst bed (not shown) located in the reactor cell 1500. The reactor cell 1500 may have a design similar to the reactor cell 1100, 1300, or 1400, for example. As such, the reactor cell 1500 includes an enclosure 1506 (at least a portion of which is optically transparent) and an optically transparent vacuum jacket 1508.

The light source 1502 according to the example of FIG. 13 comprises an LED array 1510 made up of one or more LED diodes 1512. As illustrated, the LED array 1510 is a 2×10 array of LED diodes; however, other array configurations alternatively may be used. The LED array 1510 is mounted on a printed circuit board (PCB) 1514 that includes one or more traces, leads, and/or other circuitry/components (none of which are illustrated in FIG. 13) to cause the light source 1502 to produce light (not shown) upon application of power to the light source 1502.

The conduit 1504 has a first end 1516 positioned adjacent to the reactor cell 1500 (e.g. at the location of the vacuum jacket 1508) and a second end 1518 positioned adjacent to the light source 1502 (e.g. at the LED array 1510). The first end 1516 and/or the second end 1518 are preferably conformingly secured (i.e. "flush") respectively to the reactor cell 1500 and the light source 1502 to prevent the light produced by the light source 1502 from escaping the conduit 1504 at the interfaces to the reactor cell 1500 and the light source 1502. However, as an alternative to securing the first end 1516 and/or the second end 1518 flush to the reactor cell 1500 and/or the light source 1502, a gap may be provided between the first end 1516 and the reactor cell 1500 and/or between the second end 1518 and the light source 1502. Such a gap (not illustrated in FIG. 13) can serve as a heat management feature to prevent conduction of heat across the gap, such as from the reactor cell 1500 or the light source 1502 to surrounding components. As used herein, the term "gap" refers to a spacing approximating the thickness of the enclosure or vacuum jacket of the reactor cell, which may be approximately 2 mm-10 mm. The gap may be wider for better thermal isolation, at the expense of possibly inferior light confinement. Conversely, the gap may be narrower for better light confinement, at the expense of possibly inferior thermal isolation.

The conduit 1504 includes a plurality of optically reflective walls 1520 (two side walls, a top wall, and a bottom wall in the example of FIG. 13) to guide the light from the light source 1502 to the reactor cell 1500. Optical reflectivity may be provided via a reflective coating on an interior surface of the walls 1520, for example. The optical conduits 502 may be advantageously constructed of materials exhibiting poor thermal conductivity to prevent heat loss from the photocatalyst bed (not shown) to surrounding components. Using material(s) having poor thermal conductivity may improve overall energy efficiency of the reactor. Such material selections may be made for all parts of the optical conduit walls (including sides, top, bottom, etc.) and any fittings, for example. One or more cooling mechanisms and/or means may be provided at the conduit 1504 (e.g. at the exterior of the walls 1520), light source 1502, and/or reactor cell 1500, to dissipate heat generated by the light source 1502. Further details regarding thermal management are described below.

Figure 14:
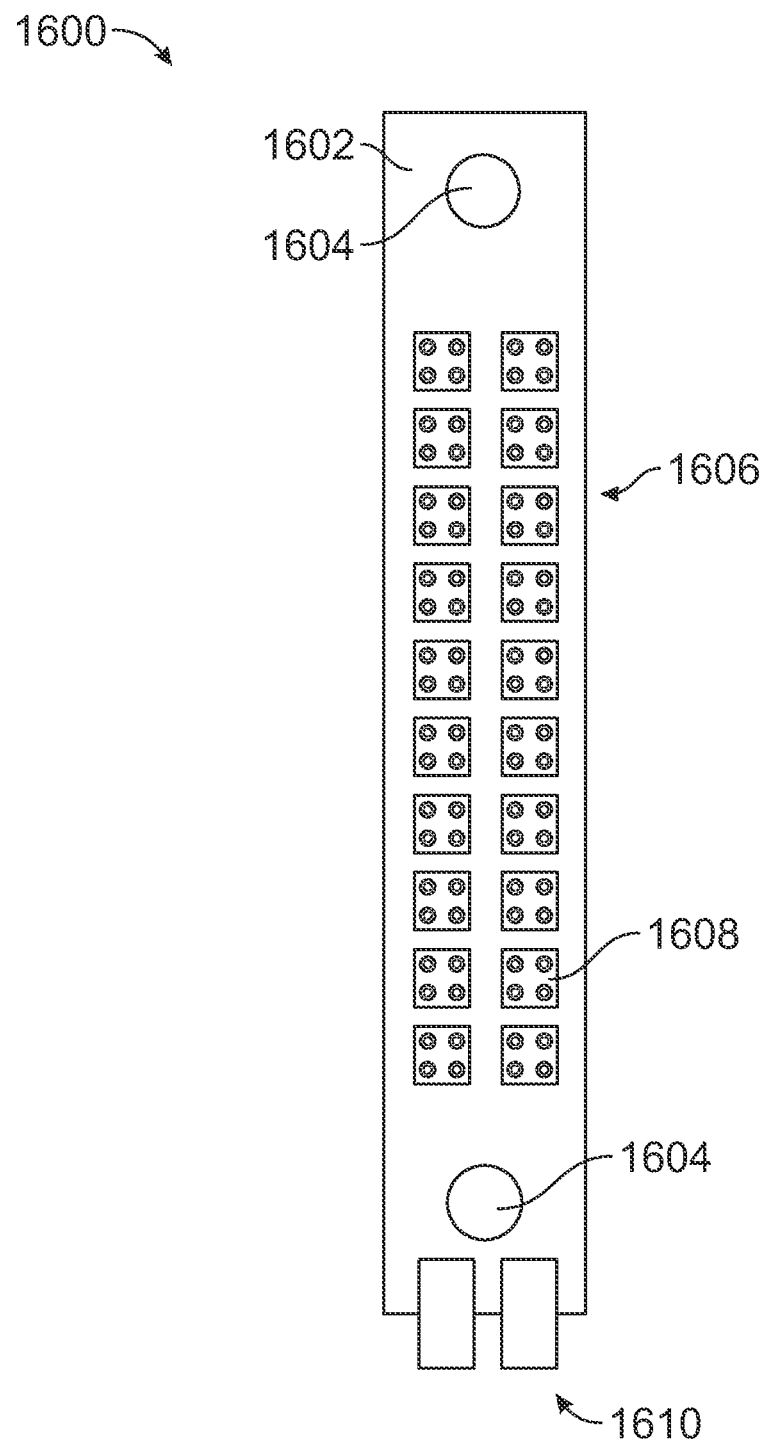
FIG. 14 is a simplified schematic diagram illustrating a light source, according to an example embodiment.

FIG. 14 is a simplified schematic diagram illustrating an example light source 1600. The light source 1600 may serve as the light source 1502 illustrated in FIG. 13 or an internal light source for the reactor cell 1800 illustrated in FIG. 15, for example.

The example light source 1600 includes a PCB 1602 having screw holes 1604 for mounting the light source 1600 to one or more surfaces or objects. Disposed or mounted on the PCB is an LED array 1606 made up of a plurality of LED diodes 1608. Electrical leads 1610 are used to supply power to the LED diodes 1608 via one or more conductive traces or other conductors (not shown) located in or on the PCB 1602.

While FIG. 14 specifies a particular array configuration (two columns and ten rows), this is merely an example, and other dimensions and array configurations may alternatively be used, depending on the particular application or other considerations. In addition, the PCB 1602 may have a different shape from the rectangular shape illustrated in FIG. 14, and need not necessarily be two-dimensional (i.e. planar).

Figure 15:
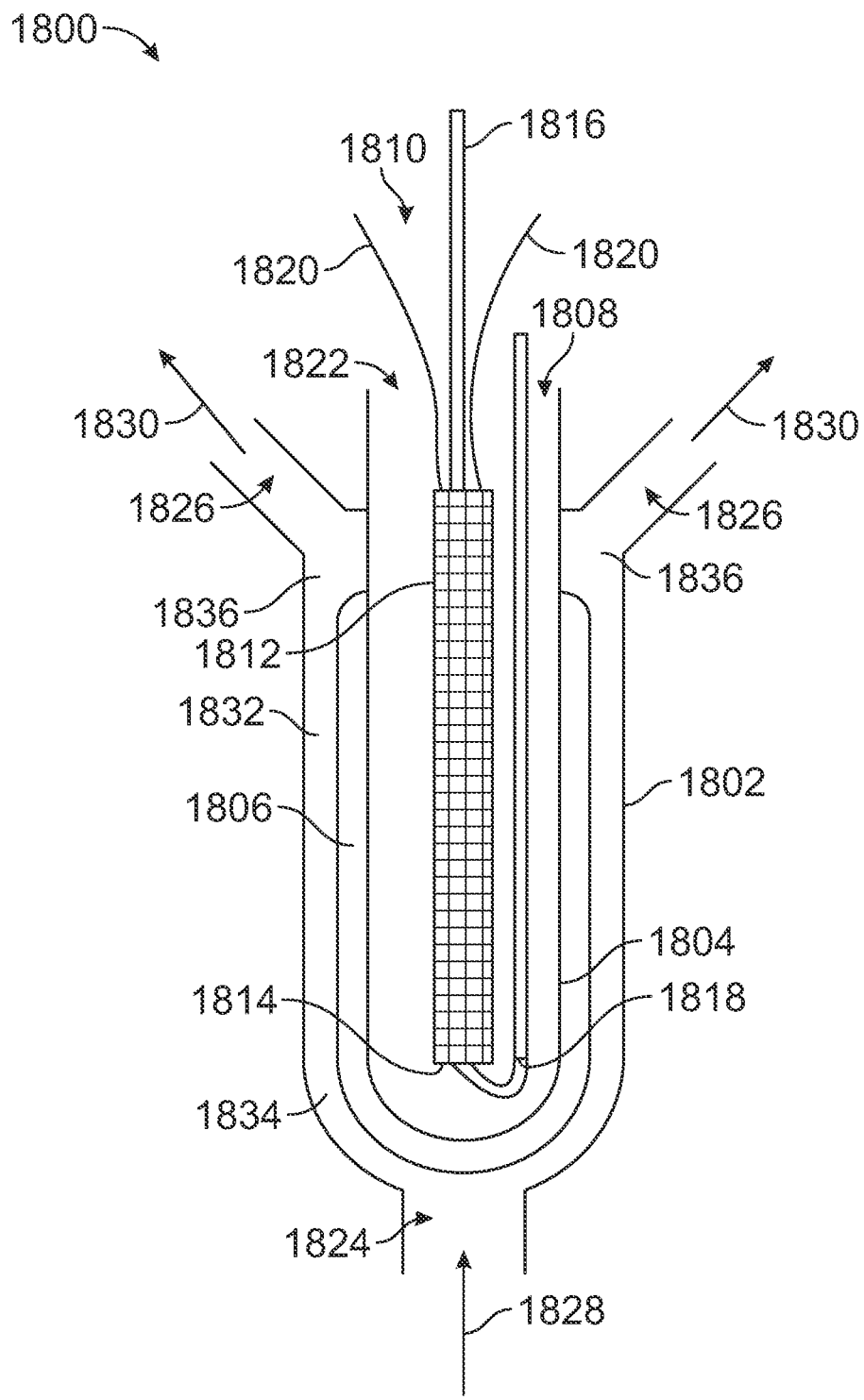
FIG. 15 is a simplified schematic diagram illustrating a reactor cell, according to an example embodiment.

FIG. 15 is a simplified schematic diagram illustrating a reactor cell 1800, according to another example. The reactor cell 1800 differs from the reactor cells 1100, 1300, 1400, 1500, and 1702 in that the light source is internal to (i.e. inside) the reactor cell, rather than external (i.e. outside).

The reactor cell 1800 includes an enclosure 1802 and an immersion well 1804, at least a portion of which is optically transparent (e.g. constructed of quartz). An optically transparent vacuum jacket 1806 surrounds at least a portion of the immersion well 804 and is situated inside the enclosure 1802. The vacuum jacket 1806 may be constructed of quartz, for example.

According to the example of FIG. 15, the immersion well 1804 has a cavity 1808 into which an LED module 1810 is disposed to provide light to a catalyst bed (not shown)

provided in the enclosure 1802 through the optically transparent portions of the immersion well 1804 and the vacuum jacket 1806. The LED module 1810 comprises one or more LED arrays 1812 mounted around the outside surface of a cylindrical LED mounting tube 1814. A coolant supply tube 1816 is coupled to a first end of the LED mounting tube 1814 to supply cooling fluid through the LED mounting tube 1814 to remove heat generated by the LED array 1812. A coolant return tube 1818 returns heated coolant fluid from the LED mounting tube 1814 for disposal or recirculation back into the LED mounting tube (via the coolant supply tube 1816) once the heat is dissipated or removed. Cooling the LED array 1812 helps to avoid overheating, which might otherwise lead to decreased performance or failure in the LED array 1812. Electrical leads 1820 supply power to the LED array 1812 and extend out the top opening 1822 of the immersion well 1804, along with the coolant supply and return tubes 1816 and 1818.

The enclosure 1802 includes a bottom opening 1824 and two or more top openings 1826 for feeding input process gas 1828 and exiting process gas 1830. Between the bottom opening 1824 and top openings 1826 is a space filled with a catalyst bed 1832, bounded by portions 1834 and 1836 containing fritted glass and glass wool above and below the catalyst bed 1832. The length of the catalyst bed 1832 is the same as length of the LED module 1810, according to a preferred embodiment. The enclosure 1802 includes two or more top openings in order to facilitate flow of the process gas through the catalyst bed 1832.

To promote efficient transmission of light from the LED module 1810 through the immersion well (optically transparent) and vacuum jacket 1806 (optically transparent) to the catalyst bed 1832, the LED module 1810 may be constructed such that its top and bottom edges have reflectors (or are reflective), in order to facilitate light being directed toward the catalyst bed (rather than upwards or downwards in the immersion tube or other components). The enclosure 1802 has an outer surface that is mirrored or has a mirrored coating (toward its interior), in order to reflect any wayward light back toward the catalyst bed 1832. If desired, external heating may be provided by wrapping the outer surface of the enclosure 1802 with a heating element (not shown). A thermal blanket (not shown) may be wrapped around the entire reactor cell 1802 (with protruding leads, cooling tubes, and/or gas lines, as appropriate), to further promote efficiency by maintaining reactor heat inside. Alternatively, a vacuum jacket (not shown) might be additionally or alternatively supplied at the outer surface of the enclosure 1802.

In yet another embodiment, the reactor cell could comprise a combination of elements illustrated in FIGS. 9 and 15. For example, the LED module 1810 could located outside (external to) the reactor cell 1802, with appropriate optically transparency employed in the reactor cell 1802 to allow light to reach the catalyst bed 1822. Reflective surfaces (not shown) may be employed in conjunction with such an externally utilized LED module 1810 to promote efficient light transmission.

Single-Cell Reactor System

Figure 16A:
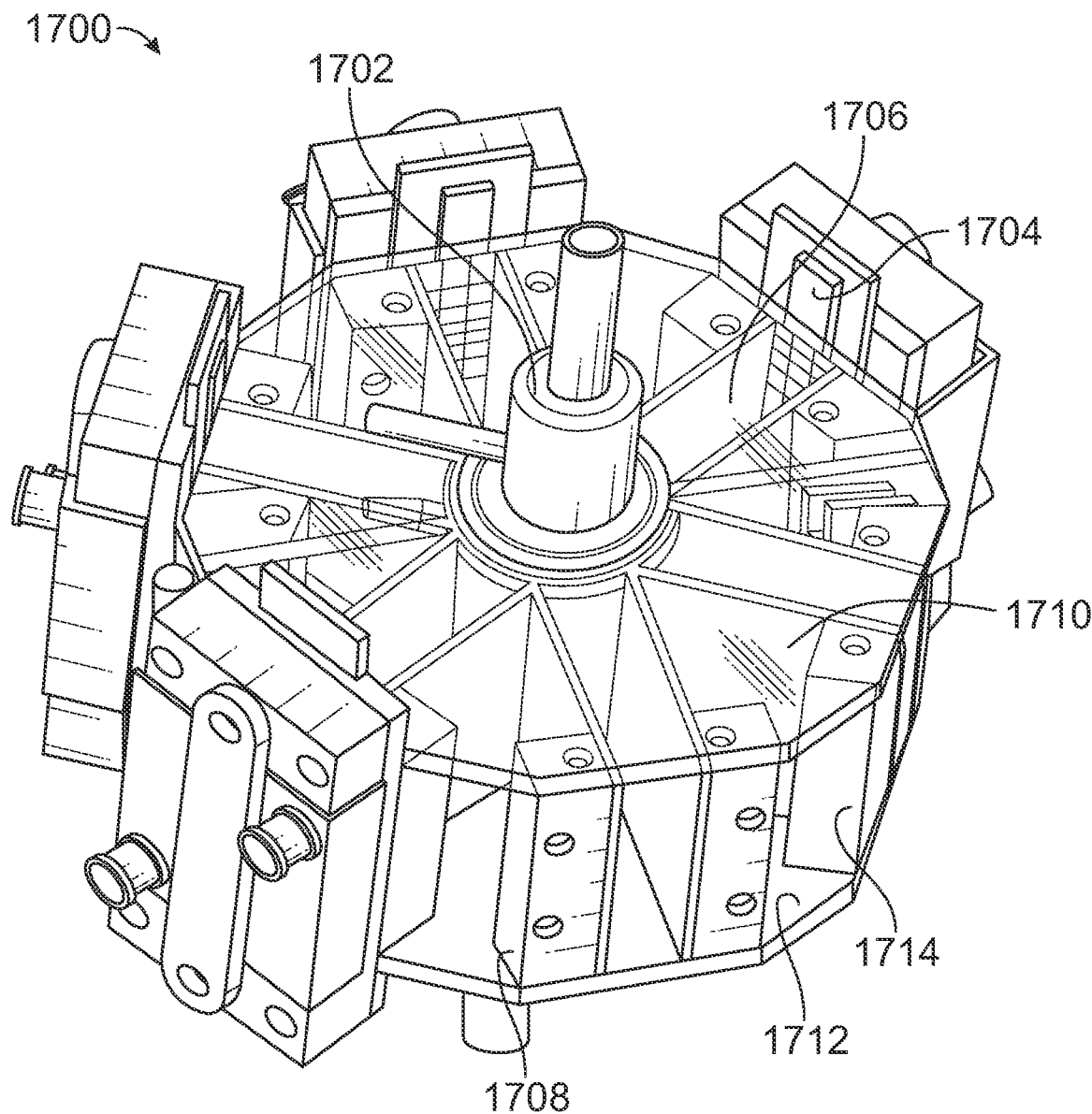
FIG. 16A is a simplified schematic diagram illustrating a single-cell reactor enclosure in a closed (latched) configuration, according to an example embodiment.
Figure 16B:
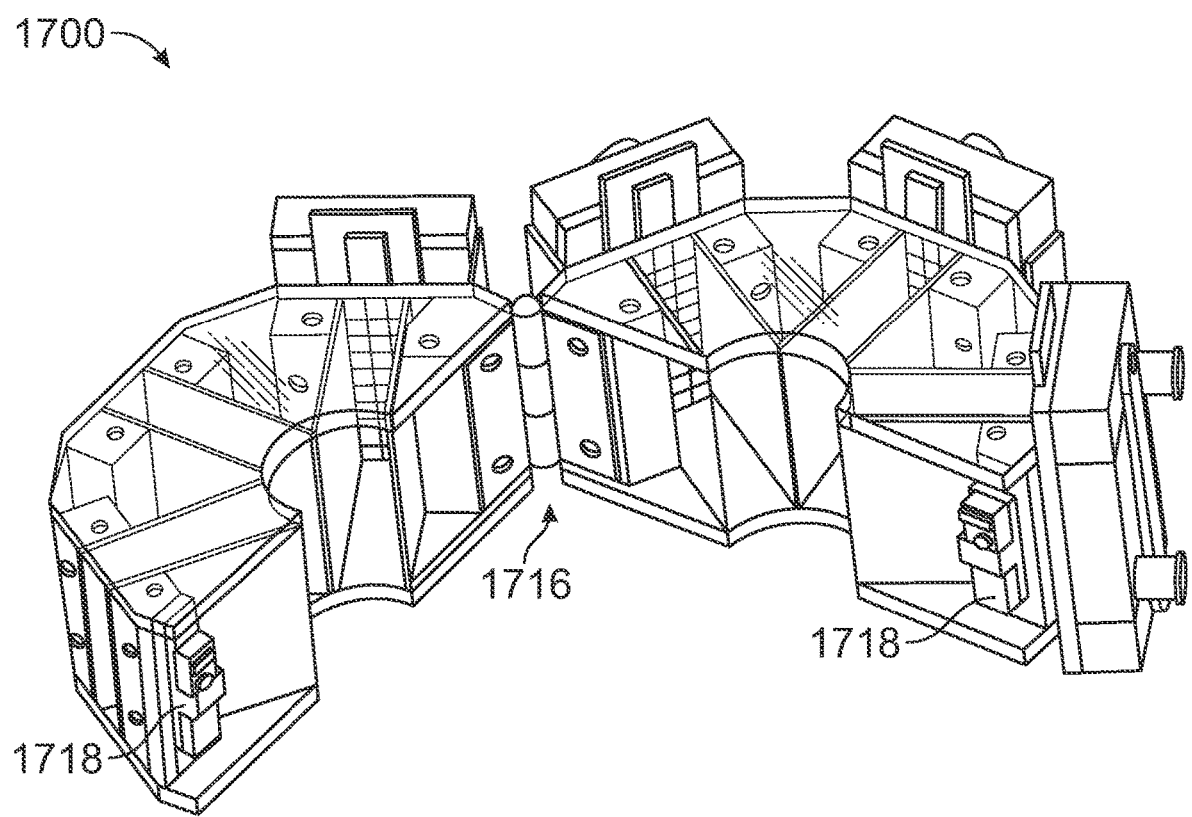
FIG. 16B is a simplified schematic diagram illustrating a single-cell reactor in an open (unlatched) configuration without a reactor cell, according to an example embodiment.

FIGS. 16A and 16B illustrate a single-cell reactor system. In particular, FIG. 16A illustrates the reactor housing 1700 in a closed (latched) configuration with a reactor cell 1702 in its center, while FIG. 16B illustrates the reactor housing 1700 in an open (unlatched) configuration without a reactor cell. The reactor cell 1702 may have a design similar to the reactor cell 1100, 1300, 1400, or 1500, for example, and may include various components described above, such as an enclosure, vacuum jacket, etc.

The housing 1700 serves as a platform to mount a plurality of light sources 1704 in a predetermined orientation, distance, and spacing around the reactor cell 1702. The light sources 1704 are preferably oriented to provide a plane of light that is generally orthogonal to the reactor cell 1702 (e.g. to the outer surface of the reactor cell 1702 or a vacuum jacket surrounding the reactor cell 1702).

With a central axis of the reactor cell 1702 aligned with (i.e. coaxial with) a central axis of the housing 1700, the distance of the light sources 1704 from the reactor cell 1702 may be set by choosing a radius (for a cylinder-like housing) that results in the desired separation between the light source 1704 and the reactor cell 1702. The distance of the light sources 1704 from the reactor cell 1702 for an housing having a different shape (i.e. non-cylindrical) may be similarly set. For the hexagonal prism housing 1700 illustrated in FIGS. 16A and 16B, the distance between the central axis and the midpoint of each face may be used to set a preferred distance of the light sources 1704 from the reactor cell 1702.

Spacing between light sources 1704 may be chosen based on space constraints (e.g. to accommodate the size of any PCBs, mounting blocks, cooling mechanisms, etc.) while still providing the desired amount and intensity of light to the reactor cell 1702. In the example of FIGS. 16A and 16B, a plurality of optical conduits 1706 (similar to the optical conduit 1504 described with reference to FIG. 13) are provided with the plurality of light sources 1704 to channel or guide light from the light sources 1704 to the reactor cell 1702. The width of the conduit 1706 at its first end (i.e. where it is adjacent to the reactor cell) may prescribe the spacing between light sources 1704. For example, a wider spacing for the conduit 1706 at the reactor cell 1702 will generally call for light sources 1704 that are spaced further apart from one another. The light sources 1704 and conduits 1706 are preferably spaced in a regular (i.e. equidistant) configuration from one another around the periphery of the housing 1700. While the example housing 1700 is hexagonally shaped with six light sources 1704, other shapes and numbers of light sources may alternatively be used. In addition, the light sources need not be arranged in a coplanar configuration, in some embodiments. Mounting blocks 1708 may be used to securably mount the light sources 1704 and/or conduits 1706 to the housing 1700, including to one or more surfaces (some of which may be reflective to promote light transmission) embodying the housing, such as a top surface 1710, bottom surface 1712, and side wall(s) 1714.

As illustrated in FIG. 16B, the housing 1700 may include one or more mechanisms to allow for opening and closing the reactor cell, for servicing, inspection, or other purposes. As such the housing may include one or more hinges 1716 and latches 1718 to facilitate opening and closing. To accommodate such functionality, one or more surfaces of the housing 1700 may include separate pieces (e.g. the top and bottom surfaces of the housing each may be split in half). As an alternative to hinges and latches, the mechanisms may comprise only latches. As a further alternative, semi-permanent fasteners (e.g. screws or bolts) may be used to attach two or more portions of the housing 1700 to one another.

Multi-Cell Reactor Systems

Figure 17A:
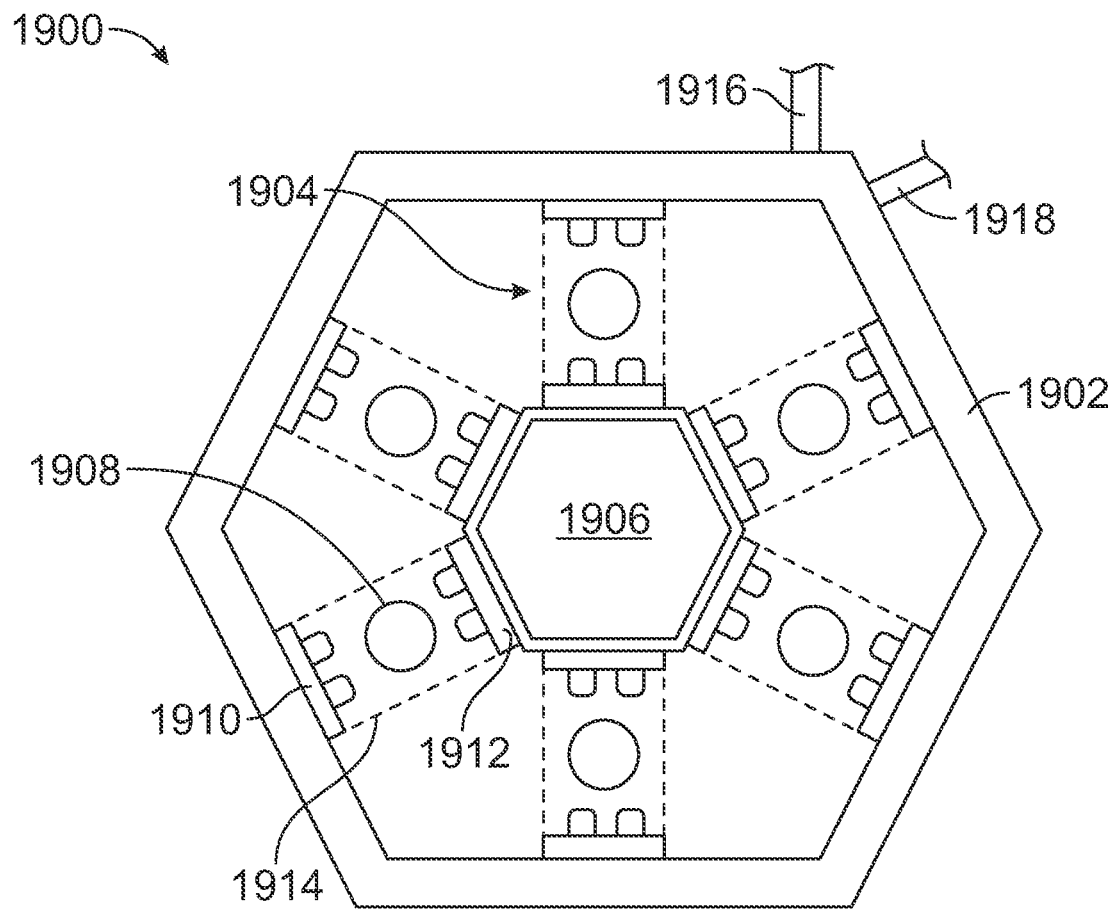
FIG. 17A is a simplified cross-sectional schematic diagram illustrating a multi-cell reactor system, according to an example embodiment.

FIG. 17A is a simplified cross-sectional schematic diagram illustrating a multi-cell reactor system 1900, shaped as a hexagonal prism, according to an example embodiment. The reactor system 1900 includes a reactor housing 1902, a plurality of reactor modules 1904, an inner mounting pillar

1906, a coolant input 1916, and a coolant output 1918. Each of the plurality of reactor modules comprises a reactor cell 1908, one or more light sources, such as the LED module 1910, and one or more optically reflective walls 1912 (which may be actively cooled, such as via circulated coolant) to form a conduit between the reactor cell 1908 and the LED module(s) 1910.

According to an example embodiment, the housing serves to hold and/or protect the plurality of reactor modules 1904, as well as provide an integrated thermal management system, such as a coolant-circulation system for the plurality of reactor modules 1904. The housing 1902 may further comprise an inner mounting pillar 1906 to provide an interior mounting surface for the plurality of reactor modules 1904, with the interior surface of the housing 1902 providing a complementary mounting surface.

In one embodiment, the housing 1902 comprises hollow walls or walls having cavities, in order to allow coolant to flow through the walls (via coolant input 1916 and coolant output 1918), to help cool the LED modules 1910 of the reactor modules 1904. This serves as a light-management feature. Because the reactor modules 1904 are arranged so that the LED modules 1910 serve as the mounting interface to the housing 1910, coolant flow through the walls of the housing 1902 provide efficient cooling to the LED modules 1910, which in turn helps to maintain a required output of incident photons from the LED module 1910 to the reactor cell 1908. Similarly, coolant can be circulated (via the coolant input 1916 and coolant output 1918) through walls of the inner mounting pillar 1906 to provide cooling for LED modules 1910 mounted to the inner mounting pillar 1906. As such, a reactor module 1904 having LED modules 1910 mounted to the housing 1902 and the inner mounting pillar 1906 is able to operate more efficiently, due to the cooling of the LED modules 1910.

The circulation of coolant through the reactor system 1900 serves as a thermal-management feature. Spent coolant (heated by the LED modules 1910) is removed via the coolant output 1918. A circulatory system (e.g. a pump) may be used to improve efficiency of the coolant system. Coolant may be recycled through the reactor housing 1902, once removed and recooled. For example, the coolant output 1918 may be connected to an external heat exchanger (not shown) to allow for use of the waste heat elsewhere. Alternatively, new coolant may be provided to the coolant input 1916 and spent coolant may be removed and disposed of via the coolant output 1918.

The housing 1902 also includes a flat hexagonally-shaped top cover (not shown) and a flat hexagonally-shaped bottom cover (not shown), which are preferably reflective on their interior sides, in order to back-reflect any stray light from the reactor modules. The mounting pillar 1906 may be attached to the top cover and bottom cover at its respective two ends (not shown), in order to provide further stability. In one embodiment, the mounting pillar 1906 is substantially hollow to form a cavity through its core, and the top cover and bottom cover can both have a corresponding hole with a radius or width that matches the interior radius or width of the hollow mounting cavity. Such a configuration allows for wiring, tubing, or other components to be run through or situated in the cavity of the mounting pillar.

The entire interior of the housing 1902 is preferably kept under vacuum. Incident light from the LED modules 1910 generates heat in the reactor cells 1908. Maintaining the housing under vacuum helps to keep this generated heat within the reactor cells 1908. This, in turn, increases the energy efficiency of the reactor module 1904 and the reactor system 1900 as a whole.

The housing 1902 has a hexagonal cross section in the example of FIG. 17A and has an associated height selected to accommodate the height (length) of each of the plurality of reactor modules 1904, which is further based on the length of the reactor cells 1908. In other embodiments, the housing 1902 may have a different-shaped cross section (other than hexagonal), such as circular, triangular, rectangular, and others.

Figure 17B:
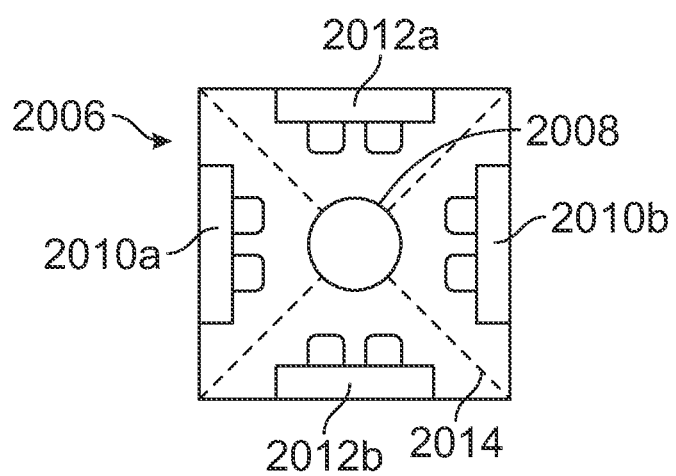
FIG. 17B is a simplified cross-sectional schematic diagram illustrating a reactor module for a multi-cell reactor system, according to an example embodiment.

Furthermore, the reactor module 1904 need not be rectangular-shaped and may have more than the two LED modules 1910 per reactor module 1904 illustrated in FIG. 17A. For example, FIG. 17B illustrates a reactor module 2006 that is square-shaped, with a reactor cell 2008 at its center. Four LED modules 2010a-b and 2012a-b provide light to the reactor cell 2008 via conduits defined by optically reflective walls 2014 (which may be actively cooled). The optically reflective walls 2014 are arranged to tunnel or channel light directly to the reactor cell 2008, while protecting opposing LED modules (e.g. 2010a and 2010b) from incident light from each other (which might otherwise shorten the lifespan or otherwise adversely affect the LED modules 2010a-b and 2012a-b). As an alternative to the square shape illustrated in FIG. 17B, the reactor module and LED modules may be configured in other geometric shapes, such as triangular, rectangular, hexagonal, etc. Each reactor module is then mounted to a reactor housing (similar to the housing 1902) and/or to other reactor modules, to form a multi-cell reactor system.

Figure 17C:
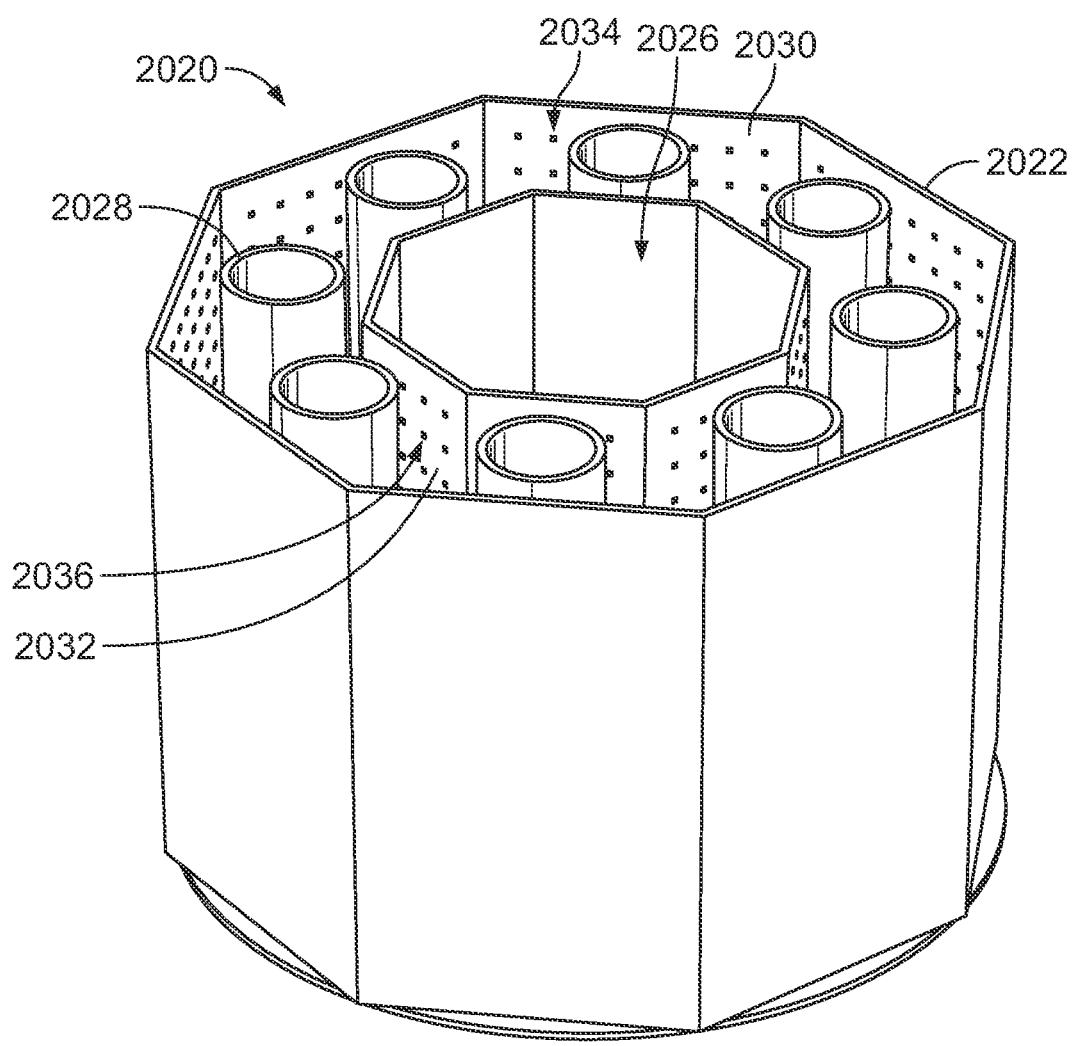
FIG. 17C is a simplified schematic diagram illustrating a multi-cell reactor system, according to another example embodiment.

FIG. 17C is a simplified schematic diagram illustrating a multi-cell reactor system 2020, according to another example embodiment. The reactor system 2020, like the reactor system 1900 of FIG. 17A, includes a housing 2022, an inner mounting pillar 2026, and a plurality of reactor cells 2028. While the reactor system 1900 utilizes a hexagonal prism shape for the housing and inner mounting pillar, the reactor system 2020 utilizes an octagonal prism shape. Other shapes having other numbers of sides, such as ten, twelve, etc., could alternatively be used for either reactor system 1900 or reactor system 2020.

A primary difference between the reactor system 1900 and the reactor system 2020 is that the reactor system 2020 does not utilize the confined reactor modules 1904 of the reactor system 1900. Instead, the reactor system 2020 includes a first plurality of light sources disposed on an interior surface 2030 of the housing 2022 and a second plurality of light sources disposed on a periphery 2032 of the inner mounting pillar 2026. The first and second pluralities of light sources preferably include a multitude of LED devices 2034 and 2036, respectively. In the conceptual illustration of FIG. 17C, each dot is an LED device, which may itself be either an individual LED or an array of LEDs. Since the reactor system 2020 omits the reactor modules 1904, there are no corresponding optical conduits or reflective walls between the light sources and reactor cells. As an alternative, each corner or vertex of the housing 2022 and/or inner mounting pillar 2026 may include a relatively small reflector wall that preferably bisects the corner or vertex and extends orthogonally outward therefrom. Such walls, if included, do not extend from the housing 2022 to the inner mounting pillar 2026, and are, instead, much smaller (e.g. 10× or 100× smaller) than the distance between the housing 2022 and the inner mounting pillar 2026. The walls may be shaped to reflect wayward light (emitted at more than a default emission angle) back toward the reactor cell 2028. The light rays or photons from each LED device 2034, 2036 can be designed to possibly reach more than one reactor cell, potentially increasing energy efficiency of the multi-cell reactor, due to most of the output light reaching the catalyst bed in the reactor cell 2028.

The heat management and light management features described above with respect to the reactor system 1900 and elsewhere in this specification are largely applicable to the reactor system 2020. For example, the space between the housing 2022 and the inner mounting pillar 2026 may be a vacuum or air (or some other fluid). Moreover, the fluid cooling mechanisms described above may be utilized with the reactor system 2020. Since the LED devices 2034, 2036 are mounted substantially directly to the interior surface 2030 of the housing 2022 and the periphery of the inner mounting pillar 2026, cooling fluid pumped through the housing 2022 and/or inner mounting pillar 2026 will provide advantageous cooling to the LED devices 2034, 2036.

A Photocatalytic Reformer System

Figure 18:
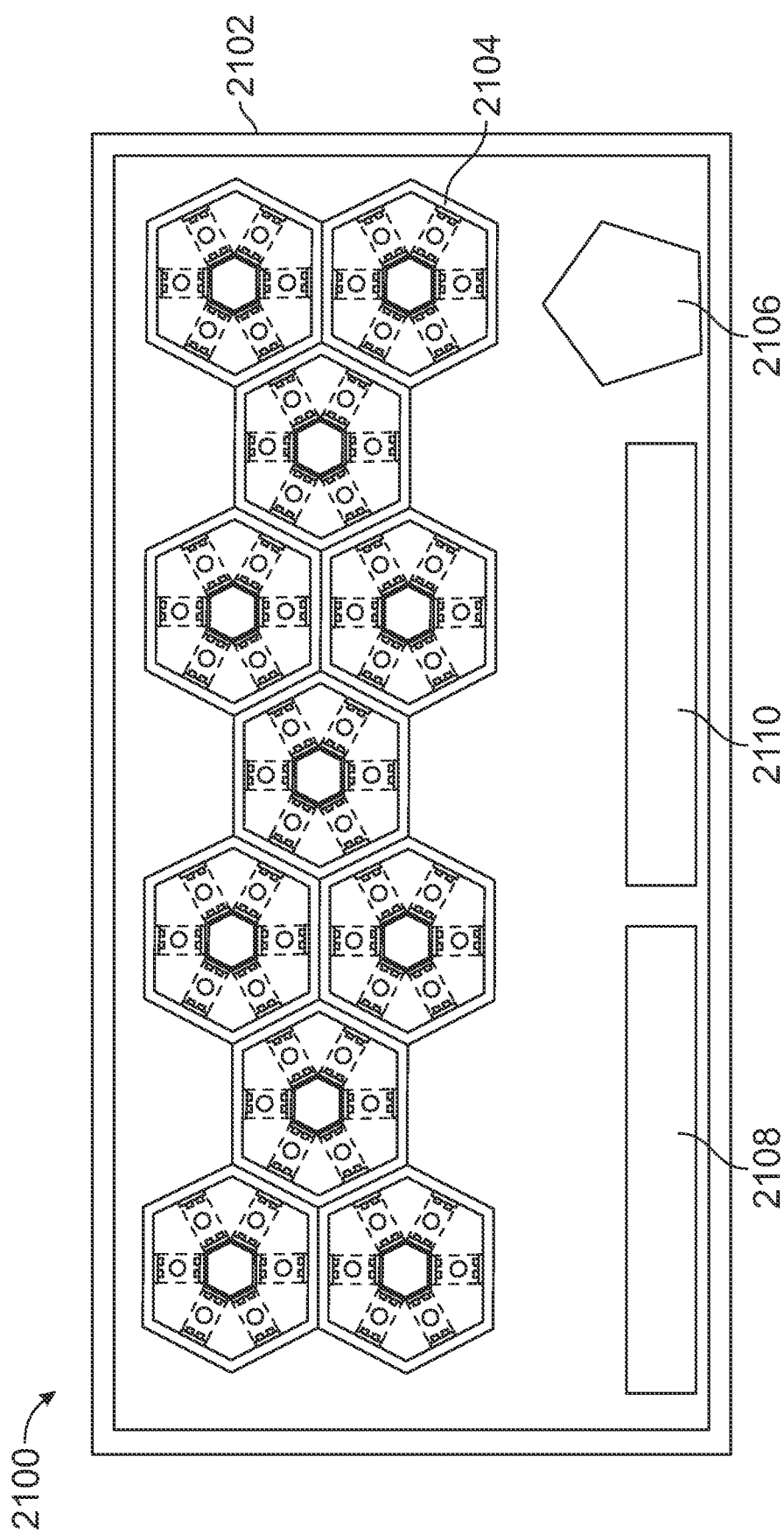
FIG. 18 is a simplified cross-sectional schematic diagram illustrating a reformer, according to an example embodiment.

FIG. 18 is a simplified cross-sectional schematic diagram illustrating a photocatalytic reformer system 2100, according to an example embodiment. The reformer system 2100 includes a reformer housing 2102, a plurality of reactor systems 2104 such as the reactor system 1900 illustrated in FIG. 17A, a vacuum unit 2106 (e.g. a compressor), an electrical unit 2108, and a cooling unit 2110.

The reformer 2100 utilizes many reactor systems 2104 to provide increased chemical production (or other desired plasmonic photocatalytic chemical reaction application) with improved efficiency. The vacuum unit 2106, electrical unit 2108, and cooling unit 2110 supply all of the reactor systems 2104, eliminating or lessening the need to provide a dedicated vacuum unit, electrical unit, and/or cooling unit for each reactor system 2104. In practice, the reformer is supplied with a process gas (e.g. a mixture of feedstock gases) upstream and releases the reformed process gas downstream through a series of inlet and outlet pipes (not shown).

Efficiency in Plasmonic Photocatalysis

Reaction rate in plasmonic photocatalysis increases with both increasing light intensity and increasing temperature. It is possible to get the same reaction rate for both the following situations: (a) no external heating is applied to the reactor and high intensity light is supplied to the reactor; and (b) some external heating is applied to the reactor and medium intensity light is supplied to the reactor. Thus, in real-world use cases, where a cost of electricity may be relatively high, a reactor that uses less electricity, i.e. lower intensity LED light source(s), along with some external heating, likely will be more economical than a reactor that uses high intensity LED source(s) with no external heating.

Thermal Management Features for Individual Reactor Cells

Incident light contributes directly to plasmonic photocatalysis by creating high-energy electrons called "hot electrons," which make and break chemical bonds as well as desorb molecules from the surface of the catalyst materials. When such hot electrons decay over time, they heat up the plasmonic photocatalyst. This creates an elevated temperature regime (above room temperature) inside the reactor. This high temperature increases conversion and efficiency of plasmonic photocatalysis; thus, it is desirable to keep this heat inside the reactor.

Embodiments described herein may include thermal management feature(s) to accomplish one or more of the following: (a) help confine or maintain heat (from external heating and/or hot electron decay) substantially within the reactor, (b) provide external heating or cooling to the interior of the reactor, or (c) reduce localized heating ("hot spots") within the catalyst bed. In addition or alternatively, one or more thermal management features may be included to manage heat associated with the light source and light pathways (reflectors, conduits, concentrators, diffusers, etc.), rather than from the plasmonic photocatalysis itself.

In some embodiments, the thermal management feature is inherent in the reactor cell enclosure itself or is disposed within the interior of the enclosure. For example, the thermal management feature may help confine or maintain heat (from external heating and/or hot electron decay) substantially within the interior of the enclosure by utilizing a material having relatively poor heat conductivity. For example, the reactor cell enclosure may be constructed substantially of quartz, which is a poor conductor of heat. This keeps most of the heat inside the reactor enclosure, where it can help to increase conversion and efficiency of plasmonic photocatalysis.

The thermal management feature may additionally or alternatively comprise a vacuum jacket (or other means for inducing a vacuum) adjacent to (e.g. surrounding) the enclosure, reactor enclosure, or other environment in which the plasmonic photocatalysis takes place. For example, the vacuum jacket may comprise a cylindrical quartz sleeve surrounding a cylindrical enclosure. Such a vacuum jacket on the reactor enclosure creates a transparent thermal barrier between the outside and the inside of the reactor cell. Transparency prevents attenuation of any incident light. The level of vacuum and the thickness of the vacuum jacket (e.g. width of an annular cross-section of a cylindrical vacuum jacket sleeve) may be designed to promote efficiency for a particular chemical reaction using a particular type of catalyst. Such an application-specific design may be selected based on materials used in the catalyst bed, enthalpy of the reaction, and wavelength and intensity of the incident light. A suitable vacuum level could be one atmosphere or lower, for example. The vacuum jacket length (e.g. cylindrical sleeve height) is the same size as or longer than the catalyst bed column, according to one embodiment.

While many or all of the reactor cell examples set forth in FIGS. 9-15 utilize a vacuum jacket, as an alternative, an environment in which the reactor cell is placed may be evacuated. For example, any of the described reactor cells described in FIGS. 9-15 and/or the reactor enclosure 1700 may be placed under vacuum, with the vacuum jacket potentially omitted.

Other embodiments in which the thermal management feature is disposed within the interior of the enclosure include those directed to providing external heating or cooling to the interior of the reactor. For example, an axial capillary (or more than one capillary extending axially through the length of the interior of the reactor cell enclosure) could be used to introduce an external heat source or to introduce an active cooling fluid to the reactor bed. The heat source could be a hot fluid or a heating element, for example. This could be beneficial for chemical reactions that are designed to take external heating, such as dry methane reforming. An example cooling fluid could be air, water, oil, or any other such cooling material, or an element of a heat exchanger. This could be beneficial for exothermic chemical reactions. Other types of heat sources and/or cooling sources could additionally or alternatively be used.

Yet other embodiments in which the thermal management feature is disposed within the interior of the enclosure include those directed to reducing localized heating ("hot spots") within the catalyst bed. For example, the catalyst itself can be chosen or modified to have materials possessing good thermal conductivity. This could beneficially reduce potential for "hot spots" within the catalyst bed that could decay the catalyst. Example materials include Aluminum Oxide ($Al_2O_3$), Cerium Oxide ($CeO_2$), and others.

Additionally or alternatively, the thermal management feature may include the catalyst bed being packed to allow for increased permeation of a process gas through the catalyst bed. For example, the catalyst bed can be packed to decrease average density and/or to create longer or less obstructed flow pathways through the catalyst bed to allow for better process gas permeation. Such packing may additionally promote thermal conductivity.

In addition or as an alternative to the aforementioned features for managing heat associated with the plasmonic photocatalysis, one or more thermal management features may be included to manage heat associated with a light source (e.g. one or more external light sources) and/or light pathways (reflectors, conduits, concentrators, diffusers, etc.). For example, any reflectors or reflective surfaces may be constructed using insulative materials (i.e. materials that are poor conductors of heat. As another example, the optical conduits can be actively cooled (e.g. by cooling the other walls and/or by periodically passing a gust of air through the bottom and top of the optical conduits) to prevent air trapped in the optical conduits from becoming too hot.

For one or more of the aforementioned embodiments, a thermal blanket may be provided to further promote heat retention within the reactor. For example, the reactor enclosure and/or vacuum sleeve (and possibly other components of the entire reactor system) may be wrapped with a thermal blanket to keep heat within the reactor system.

Other thermal management features may additionally or alternatively be used. For example, the thermal management feature may include a fluid input coupled to a first end of the cavity and a fluid output coupled to a second end of the cavity such that fluid may flow through the reactor cell to add or remove heat from the reactor cell; or the thermal management feature may comprise a metal rod or metal wires configured for heat conduction. According to yet another embodiment, an outer surface of the reactor enclosure and/or vacuum sleeve is wrapped with a heating element, when necessary, to provide external heating.

Light Management Features for Individual Reactor Cells

Since plasmonic photocatalysis relies on incident light for hot electron creation, light utilization is an important consideration for a photocatalytic reactor cell. High intensity light increases the rate of photocatalysis. Electricity costs associated with LED light sources are an important part of the operations cost of a photocatalytic reactor. Since higher-intensity LED light sources require more electricity than lower-intensity light sources, any improvements to light utilization can provide benefits to both reaction rate and energy (and cost) efficiency.

Embodiments described herein may include light management feature(s) to accomplish one or more of the following: (a) the enclosure, vacuum jacket, and/or immersion tube is constructed of quartz or another such material that is optically transparent to a wavelength of light used for a particular desired chemical reaction, (b) any optical conduits between light sources and the reactor cell have reflective walls, (c) any optical conduits between light sources and the reactor cell are joined flush with the reactor cell to prevent leakage of light, (d) the catalyst bed is designed to absorb most or all of the incident light, (e) the catalyst bed is filled up to a longer column than the incident light so as to ensure light utilization (so light does not escape from the top of catalyst column), (f) the outside of the glass reactor cell is coated with a mirrored layer in the regions above and below the optical conduits, in order to reflect any light escaping from the vacuum jacket back into the reactor cell, and in particular, the catalyst bed, (g) the PCB of the light source or LED module is painted or otherwise provided with a reflective coating to back-reflect any wayward light that strikes it, (h) light sources (e.g. LED modules and arrays) are arranged in the reactor enclosure to prevent a light source's emitted light from striking another light source within the reactor enclosure, in order to preserve integrity of the LEDs and maintain light output consistency, and (i) when high intensity LED light is used, these LED modules are actively cooled, such as by using a heat exchanger or by passing a coolant fluid on the back of a light source or LED module PCB. (LED efficiency and, hence, light output decreases with increasing temperature. Actively cooling the LEDs keeps the light output and reaction rate consistent.)

As mentioned, the enclosure and/or one or more other components are at least partially optically transparent. The following discussion pertains to the enclosure, but many of the same principles apply to the vacuum jacket and immersion well, for example. Advantageously, the optically transparent enclosure according to some embodiments of the disclosure may have low thermal expansion.

In traditional fixed bed reactors, no effort is typically made to provide catalyst support beds that are optically transparent (i.e., the light in a traditional fixed bed reactor does not penetrate the catalyst bed). In contrast, To allow for greater light utilization (i.e. less leakage), the catalyst support bed is preferably designed to absorb most of the incident light (i.e. very little, if any, light passes from the light source entirely through the catalyst support bed and out a side opposite from the light source). This may be accomplished, at least in part, through selecting catalyst support materials having a desired transmittance for the particular geometry and dimensions of the reactor cell. Further details regarding examples of suitable catalyst support materials are set forth above.

Another aspect provides methods for using the reactor systems to transform reactants. Specifically, the disclosure provides methods for transforming at least one reactant into at least one reformate, the method comprising: adding at least one reactant into a reactor system of the disclosure; and illuminating, via the at least one light source, an interior of the reactor system and/or reactor cell(s).

In an alternative embodiment of the methods of the disclosure, the illuminating is from a light source external to the reactor system.

In some embodiments of the method, no external heating (e.g. from a dedicated heating source) is applied. In some embodiments, the methods further comprise externally heating the reactor cell. The external heating may be accomplished via the thermal management feature as described above, or via some other heating technique.

Representative methods of the disclosure include, but are not limited to, oxidation and reduction, water or air pollution remediation reactions, $NO_x$ and $N_2O$ decompositions, hydrogenation such as acetylene hydrogenation, carbon dioxide conversion, and nitrogen activation, including the synthesis of ammonia. Some of the representative chemical transformations include:

$$CH_4 + H_2O \rightarrow H_2 + CO$$

$$CH_4 + CO_2 \rightarrow H_2 + CO$$

$$H_2O + CO \rightarrow H_2 + CO_2$$

$$CO_2 + H_2 \rightarrow CO + H_2O$$

$$CO_2 + H_2 \rightarrow CH_4 + H_2O$$

$$N_2O \rightarrow N_2 + O_2$$

$$C_2H_2 + H_2 \rightarrow C_2H_4$$

$$H_2 + N_2 \rightarrow NH_3$$

$$NH_3 \rightarrow H_2 + N_2$$

$$CO_2 + H_2 \rightarrow CH_4OH + H_2O$$

Thus, in some embodiments, the reactants are methane and water; or the reactants are methane and carbon dioxide; or the reactants are carbon monoxide and water; or the reactants are carbon dioxide and hydrogen gas; or the reactant is nitrous oxide; or the reactants are acetylene and hydrogen gas; or the reactants are hydrogen gas and nitrogen gas; or the reactants are carbon dioxide and hydrogen gas.

The methods of the disclosure may be performed at any suitable temperature. For example, in some embodiments, the methods of the disclosure are performed at a temperature ranging from about 100° C. to about 300° C.; or about 100° C. to about 250° C.; or about 100° C. to about 200° C.; or about 150° C. to about 300° C.; or about 150° C. to about 250° C.; or about 150° C. to about 200° C.; or about 200° C. to about 300° C.; or about 200° C. to about 250° C.; or about 180° C. to about 220° C.; or about 190° C. to about 210° C.; or about 20° C. to about 300° C.; or about 20° C. to about 250° C.; or about 20° C. to about 200° C.; or about 20° C. to about 150° C.; or about 20° C. to about 100° C.

The methods of the disclosure may be performed at any suitable pressure. For example, in some embodiments, the methods of the disclosure are performed at a pressure ranging from about 14 psi to about 300 psi, or about 14 psi to about 200 psi, or about 14 psi to about 100 psi, or about 14 psi to about 50 psi, or about 100 psi to about 300 psi, or about 100 psi to about 200 psi.

In the methods of the disclosure, the reactants might be introduced into the reactor system at any suitable temperature. In some embodiments, the reactant has temperature ranging from about 200° C. to about 300° C.; or about 200° C. to about 270° C.; or about 200° C. to about 250° C.; or about 230° C. to about 270° C., when introduced into the reactor cell.

It is understood that the examples and embodiments described herein are for illustrative purposes only and that various modifications or changes in light thereof will be suggested to persons skilled in the art and are to be incorporated within the spirit and purview of this application and scope of the appended claims. All publications, patents, and patent applications cited herein are hereby incorporated herein by reference for all purposes.

What is claimed is:

1. A multi-cell photocatalytic reactor system, comprising:
   a reactor housing; and
   a plurality of reactor modules, each reactor module comprising:
      a reactor cell;
      at least one light source; and
      a conduit between the reactor cell and each of the at least one light source,
         wherein the conduit comprises at least one optically reflective wall.

2. The multi-cell photocatalytic reactor system of claim 1, further comprising an inner mounting pillar upon which each of the plurality of reactor modules is mounted.

3. The multi-cell photocatalytic reactor system of claim 2, wherein the inner mounting pillar is located at a center of the reactor housing, and wherein each of the plurality of reactor modules is mounted around the periphery of the inner mounting pillar.

4. The multi-cell photocatalytic reactor system of claim 3, wherein the inner mounting pillar comprises a cavity, and wherein the photocatalytic reactor system further comprises at least one of wiring or coolant tubing in the cavity of the inner mounting pillar.

5. The multi-cell photocatalytic reactor system of claim 3, wherein the reactor housing comprises an interior mounting surface, and wherein each of the plurality of reactor modules is mounted both to the periphery of the inner mounting pillar and to the interior mounting surface of the housing.

6. The multi-cell photocatalytic reactor system of claim 1, wherein the housing is cylindrically shaped, with a circular cross-section.

7. The multi-cell photocatalytic reactor system of claim 1, wherein the housing has a regular polygonal cross section.

8. The multi-cell photocatalytic reactor system of claim 1, wherein the housing has a hexagonal cross section.

9. The multi-cell photocatalytic reactor system of claim 1, wherein the conduit is actively cooled via circulated coolant.

10. The multi-cell photocatalytic reactor system of claim 1, further comprising:
    a coolant input; and
    a coolant output.

11. The multi-cell photocatalytic reactor system of claim 10, wherein the housing comprises at least one wall having at least one cavity through which coolant flows via the coolant input and the coolant output.

12. The multi-cell photocatalytic reactor system of claim 11, wherein the coolant is applied to the at least one light source to help maintain a required output of incident photons from the light source to the reactor cell.

13. The multi-cell photocatalytic reactor system of claim 10, further comprising a pump to circulate coolant through the reactor system via the coolant input and coolant output.

14. The multi-cell photocatalytic reactor system of claim 13, further comprising a heat exchanger to receive spent coolant from the coolant output.

15. The multi-cell photocatalytic reactor system of claim 1, wherein the housing comprises a top cover and a bottom cover, both of which are reflective on their interior sides in order to back-reflect any stray light from the reactor modules.

16. The multi-cell photocatalytic reactor system of claim 5, wherein each of the plurality of reactor modules is rectangular-shaped and comprises:
    a reactor cell located substantially at its center;
    a first light source mounted proximate the interior mounting surface of the housing; and
    a second light source mounted proximate the periphery of the inner mounting pillar.

17. The multi-cell photocatalytic reactor system of claim 16, wherein each of the plurality of reactor modules is square-shaped and further comprises third and fourth light sources.

18. The multi-cell photocatalytic reactor system of claim 1, wherein the reactor cell comprises a reactor cell enclosure and a plasmonic photocatalyst on a catalyst support disposed within the reactor cell enclosure, wherein at least a portion of the reactor cell enclosure is optically transparent and comprises at least one inlet for a reactant to enter the reactor cell and at least one outlet for a reformate to exit the reactor cell, wherein, upon application of the at least one light source, the reactor cell is configured to transform the reactant into the reformate.

19. The multi-cell photocatalytic reactor system of claim 1, further comprising at least one light-management feature and/or at least one thermal-management feature.

20. A multi-cell photocatalytic reactor system, comprising:
- a reactor housing having a first plurality of LED devices disposed on an interior surface of the reactor housing;
- an inner mounting pillar having a second plurality of LED devices disposed on a periphery of the inner mounting pillar; and
- a plurality of reactor cells each comprising a plasmonic photocatalyst on a catalyst support, wherein, upon application of light from the first and second pluralities of LED devices, each of the plurality of reactor cells is configured to transform a reactant into a reformate.

* * * * *